(12) United States Patent
Itou et al.

(10) Patent No.: US 12,497,758 B2
(45) Date of Patent: Dec. 16, 2025

(54) WORK MACHINE AND REMOTE OPERATION SYSTEM OF WORK

(71) Applicant: HITACHI CONSTRUCTION MACHINERY CO., LTD., Tokyo (JP)

(72) Inventors: Hironori Itou, Tsukuba (JP); Takenori Hiroki, Ami-Machi (JP); Yasumaro Komiya, Kitaamine-Machi (JP); Daiki Machida, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 118 days.

(21) Appl. No.: 18/686,056

(22) PCT Filed: Mar. 27, 2023

(86) PCT No.: PCT/JP2023/012172
§ 371 (c)(1),
(2) Date: Feb. 23, 2024

(87) PCT Pub. No.: WO2023/190323
PCT Pub. Date: Oct. 5, 2023

(65) Prior Publication Data
US 2025/0188707 A1  Jun. 12, 2025

(30) Foreign Application Priority Data

Mar. 29, 2022  (JP) ................. 2022-054375

(51) Int. Cl.
*E02F 9/20* (2006.01)
*E02F 3/32* (2006.01)
(Continued)

(52) U.S. Cl.
CPC ............... *E02F 9/205* (2013.01); *E02F 3/32* (2013.01); *E02F 9/2062* (2013.01);
(Continued)

(58) Field of Classification Search
CPC ........ B60K 2028/003; E02F 3/32; E02F 9/20; E02F 9/205; E02F 9/2062; E02F 9/2203;
(Continued)

(56) References Cited

U.S. PATENT DOCUMENTS 10,754,342 B2 * 8/2020 Tomita ................ G05D 1/027
2010/0277590 A1  11/2010 Ariga et al.
(Continued)

FOREIGN PATENT DOCUMENTS

JP            05-50074 U    7/1993
JP         2005-226523 A    8/2005
(Continued)

OTHER PUBLICATIONS

International Search Report of PCT/JP2023/012172 dated Jun. 6, 2023.
(Continued)

*Primary Examiner* — Tyler J Lee
(74) *Attorney, Agent, or Firm* — MATTINGLY & MALUR, PC

(57) ABSTRACT

A work machine includes an object detection device, a photo shooting device, and a controller that controls starting of a prime mover. The controller determines whether or not an object exists around a machine body on the basis of a detection signal arising from detection by the object detection device. The controller starts the prime mover in a case in which a prime mover starting command has been acquired from an external information terminal and when it is determined that an object does not exist around the machine body. The controller transmits data of video shot by the photo shooting device and a starting approval request of the prime mover to the external information terminal without starting the prime mover in the case in which the prime mover starting command has been acquired from the external
(Continued)

information terminal and when it is determined that an object exists around the machine body. The controller starts the prime mover when acquiring an approval command to the starting approval request of the prime mover from the external information terminal.

4 Claims, 12 Drawing Sheets

(51) Int. Cl.
*E02F 9/22* (2006.01)
*E02F 9/24* (2006.01)
*E02F 9/26* (2006.01)

(52) U.S. Cl.
CPC .............. *E02F 9/2203* (2013.01); *E02F 9/24* (2013.01); *E02F 9/261* (2013.01); *E02F 9/2285* (2013.01); *E02F 9/2292* (2013.01); *E02F 9/2296* (2013.01)

(58) Field of Classification Search
CPC ..... E02F 9/2285; E02F 9/2292; E02F 9/2296; E02F 9/24; E02F 9/26; E02F 9/261; E02F 9/262; F02N 11/0807; F02N 11/0848; F02N 11/101; F02N 2200/12; F02N 2300/302; G06V 20/56; H04N 7/183
See application file for complete search history.

(56) References Cited

U.S. PATENT DOCUMENTS

| | | | |
|---|---|---|---|
| 2018/0136664 A1* | 5/2018 | Tomita | G05D 1/027 |
| 2018/0210444 A1* | 7/2018 | Sakaguchi | G01S 15/86 |
| 2021/0348362 A1 | 11/2021 | Nishikawa et al. | |
| 2021/0395981 A1 | 12/2021 | Sasaki et al. | |
| 2023/0272595 A1* | 8/2023 | Jensen | G05D 1/2247 |
| | | | 701/2 |

FOREIGN PATENT DOCUMENTS

| | | |
|---|---|---|
| JP | 2009-138497 A | 6/2009 |
| JP | 2014-173258 A | 9/2014 |
| JP | 2020-090838 A | 6/2020 |
| JP | 2020-097866 A | 6/2020 |
| JP | 2020-159063 A | 10/2020 |

OTHER PUBLICATIONS

International Preliminary Report on Patentability received in corresponding International Application No. PCT/JP2023/012172 mailed Oct. 10, 2024.

* cited by examiner

WORK MACHINE AND REMOTE OPERATION SYSTEM OF WORK

TECHNICAL FIELD

The present invention relates to a work machine in which a prime mover such as an engine is remotely started and a remote operation system of a work machine.

BACKGROUND ART

In a work machine used in a cold region, warm-up operation of an engine that is a prime mover is executed before start of work by the work machine. An operator of the work machine frequently waits at a place remote from the work machine until the warm-up operation is completed. Therefore, it is desirable that starting of the engine for executing the warm-up operation can be executed by remote operation.

Furthermore, needs for making a configuration to allow a hydraulic actuator of the work machine to be remotely operated, not limited for starting the engine, have further increased because labor and time of movement of an operator to a work site can be saved and it is possible to shorten the movement time and save the movement cost.

As a device that remotely starts an engine, a device that does not start the engine when detecting an object is known (refer to patent document 1). Disclosed in patent document 1 is a remote starting device of an engine that does not start the engine when the existence of a person on the rear side of a muffler that discharges an exhaust gas is detected.

PRIOR ART DOCUMENT

Patent Document

Patent Document 1: JP-Hei-5-50074-U

SUMMARY OF THE INVENTION

Problem to be Solved by the Invention

In the case of starting an engine of a work machine, inspection work is executed before the starting of the engine. In the inspection work, check work of the amounts of engine oil, hydraulic operating fluid, and cooling water, check work of whether or not oil leakage of a hydraulic actuator exists, and so forth are included. In the case of remotely starting the engine of the work machine, the operator oneself cannot execute the inspection work of the work machine and a worker other than the operator executes the inspection work of the work machine.

If the engine of the work machine is remotely started in the inspection work of the work machine by the worker, there is a possibility of the occurrence of an event such as contact of a cooling fan that operates due to the starting of the engine with the worker. Furthermore, if an engine is started by a remote operation device that allows remote operation of a hydraulic actuator of a work machine such as a hydraulic excavator and work by the work machine is started, there is a possibility of the occurrence of an event such as contact of a swing structure with a worker. Thus, it is conceivable that the remote starting of the engine is prohibited when a worker exists around the machine body of the work machine.

However, a situation in which the engine may be started even when a worker exists around the machine body of the work machine possibly occurs. The situation where the engine may be started is the case in which the worker is not located near the cooling fan, the operator who operates the remote operation device has no intention to swing the swing structure, or the like. Thus, there is a possibility of lowering of the efficiency of work by the work machine if the remote starting of the engine is always prohibited when a worker exists around the machine body.

The present invention intends to provide a work machine that allows a prime mover to be remotely started properly according to the situation of the surroundings of the machine body.

Means for Solving the Problem

A work machine according to one aspect of the present invention includes a machine body, a work device attached to the machine body, a plurality of hydraulic actuators that drive the work device, a prime mover, a hydraulic pump that is driven by the prime mover and supplies a hydraulic operating fluid to the hydraulic actuators, an object detection device that is attached to the machine body and detects an object existing around the machine body, a photo shooting device that is attached to the machine body and shoots the surroundings of the machine body, a communication device that executes communication with an external information terminal, and a controller that controls starting of the prime mover on the basis of a prime mover starting command acquired from the external information terminal through the communication device. The controller is configured to determine whether or not an object exists around the machine body on the basis of a detection signal arising from detection by the object detection device and start the prime mover in a case in which the prime mover starting command has been acquired from the external information terminal through the communication device and when it is determined that an object does not exist around the machine body. The controller is configured to transmit data of video shot by the photo shooting device and a starting approval request of the prime mover to the external information terminal through the communication device without starting the prime mover in the case in which the prime mover starting command has been acquired from the external information terminal through the communication device and when it is determined that an object exists around the machine body and start the prime mover when acquiring an approval command to the starting approval request of the prime mover from the external information terminal through the communication device.

Advantages of the Invention

According to the present invention, it is possible to provide a work machine that can remotely start the prime mover properly according to the situation of the surroundings of the machine body.

MODES FOR CARRYING OUT THE INVENTION

A work machine 1 according to an embodiment of the present invention will be described with reference to the drawings. The work machine 1 is a machine used for various kinds of work, such as civil engineering work, construction work, and demolition work. In the present embodiment, an example in which the work machine 1 is a hydraulic excavator of a crawler type will be described.

Figure 1:
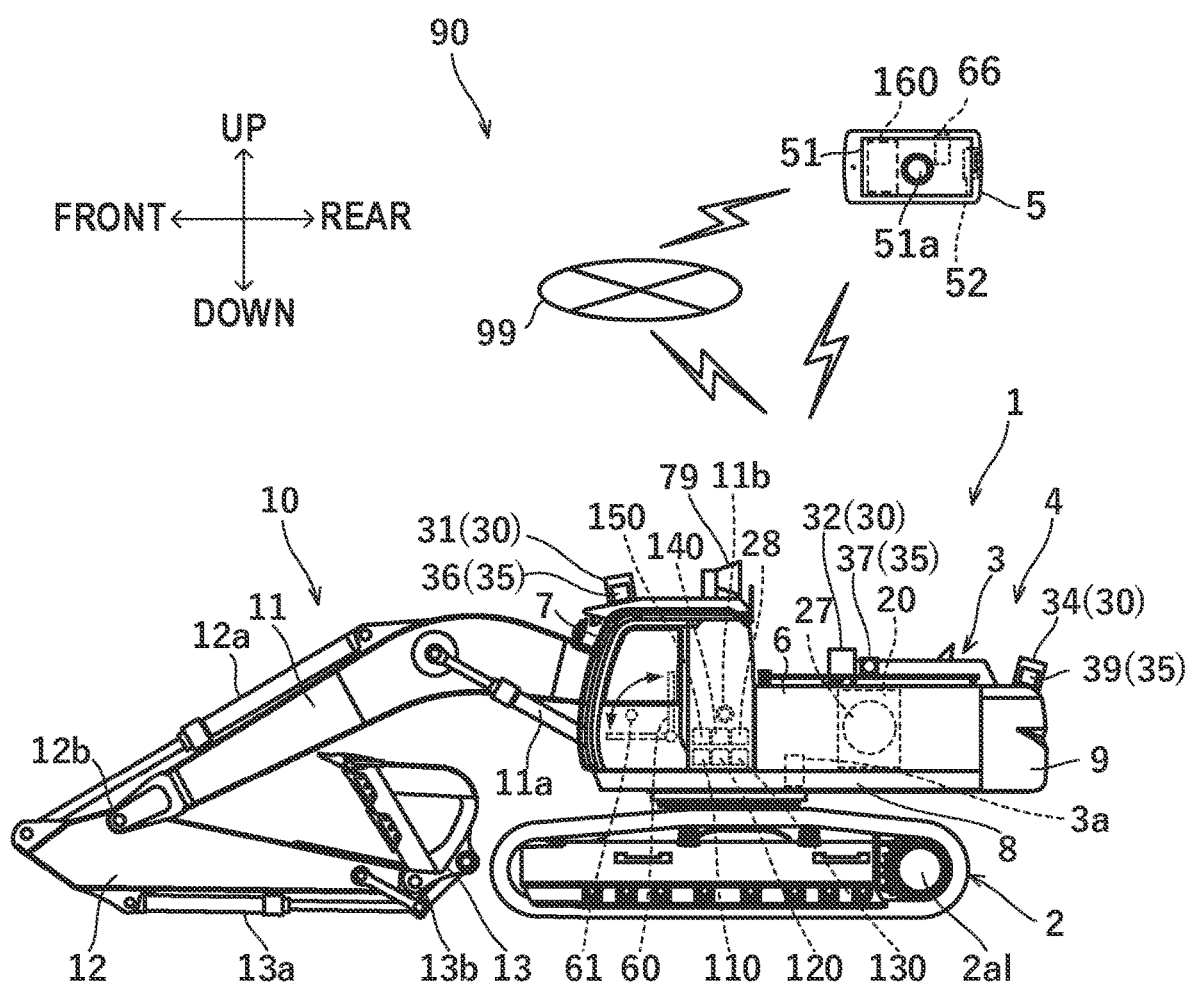
FIG. 1 is a side view of a work machine.

FIG. 1 is a side view of the work machine 1. For convenience of explanation, the front-rear and upward-downward directions of the work machine 1 are defined as illustrated in FIG. 1. That is, in the present embodiment, the front side of a cab (in this diagram, left direction) is defined as the front side of the work machine 1 unless otherwise noted. The work machine 1 includes a machine body 4 and a work device 10 attached to the machine body 4.

The machine body 4 includes a track structure 2 and a swing structure 3 swingably disposed on the track structure 2, and the work device 10 is attached to a front part of the swing structure 3. The track structure 2 includes a left-side travelling hydraulic motor 2al that drives a left crawler and a right-side travelling hydraulic motor 2ar (see FIG. 2) that drives a right crawler. The track structure 2 travels through driving of the pair of left and right crawlers by the travelling hydraulic motors 2al and 2ar. The swing structure 3 includes a swing hydraulic motor 3a and swings through driving of the swing hydraulic motor 3a.

The swing structure 3 has a swing frame 8, a cab 7 disposed on the left side of a front part of the swing frame 8, a counterweight 9 disposed at a rear part of the swing frame 8, and an engine chamber 6 disposed on the rear side of the cab 7 in the swing frame 8. Housed in the engine chamber 6 are an engine 20 that is a prime mover, hydraulic pumps 25 and 26 (see FIG. 2) driven by the engine 20, and a battery 28 as a power supply device that supplies power to pieces of equipment (controller and so forth) mounted in the work machine 1. The work device 10 is pivotally joined to the center of the front part of the swing frame 8.

The engine 20 is a power source of the work machine 1 and is configured by an internal combustion engine such as a diesel engine. A cooling fan 27 is directly connected to the engine 20. The cooling fan 27 is driven by the engine 20 and cools the engine 20 by blowing air taken in from the outside of the engine chamber 6 toward the engine 20.

The work device 10 is an articulated work device having a plurality of driving target members pivotally joined and a plurality of hydraulic cylinders that drive the driving target members. In the present embodiment, a boom 11, an arm 12, and a bucket 13 as three driving target members are joined in series. A base end part of the boom 11 is pivotally joined at the front part of the swing frame 8 by a boom pin 11b. A base end part of the arm 12 is pivotally joined at a tip part of the boom 11 by an arm pin 12b. The bucket 13 is pivotally joined at a tip part of the arm 12 by a bucket pin 13b.

The boom 11 is driven by a hydraulic cylinder (hereinafter, referred to also as boom cylinder 11a) that is a hydraulic actuator, and pivots relative to the swing frame 8. The arm 12 is driven by a hydraulic cylinder (hereinafter, referred to also as arm cylinder 12a) that is a hydraulic actuator, and pivots relative to the boom 11. The bucket 13 is driven by a hydraulic cylinder (hereinafter, referred to also as bucket cylinder 13a) that is a hydraulic actuator, and pivots relative to the arm 12. One end side of the boom cylinder 11a is connected to the boom 11 and the other end side is connected to the swing frame 8. One end side of the arm cylinder 12a is connected to the arm 12 and the other end side is connected to the boom 11. One end side of the bucket cylinder 13a is connected to the bucket 13 through a link member and the other end side is connected to the arm 12. Work such as excavation of the ground or leveling of the ground is executed through driving of the respective hydraulic actuators of the work device 10.

To the machine body 4, an object detection device 30 that detects an object existing around the machine body 4 and a photo shooting device 35 that shoots the surroundings of the machine body 4 are attached.

The object detection device 30 includes a detection sensor 31 that is attached to the upper surface of the outer shell of the cab 7 and detects an object existing on the front side of the swing structure 3 and a detection sensor 32 that is disposed on the left side of the upper surface of the outer shell of the engine chamber 6 and detects an object existing on the left side of the swing structure 3. The object detection device 30 includes also a detection sensor 33 (see FIG. 2, not illustrated in FIG. 1) that is disposed on the right side of the upper surface of the outer shell of the engine chamber 6 and detects an object existing on the right side of the swing structure 3 and a detection sensor 34 that is disposed on the upper surface of the counterweight 9 and detects an object existing on the rear side of the swing structure 3.

The detection sensors 31 to 34 transmit ultrasonic waves as probing waves and receive reflected waves reflected by an object to measure the distance to the object. The detection sensors 31 to 34 are not limited to those that use ultrasonic waves and may be those that measure the distance to an object by using infrared rays. The detection sensors 31 to 34 may be millimeter wave radars, 3D-Lidar, or the like.

The photo shooting device 35 includes a camera (hereinafter, referred to also as front camera) 36 that is attached to the upper surface of the outer shell of the cab 7 and shoots the front side of the swing structure 3, and a camera (hereinafter, referred to also as left camera) 37 that is disposed on the left side of the upper surface of the outer shell of the engine chamber 6 and shoots the left side of the swing structure 3. The photo shooting device 35 includes also a camera (hereinafter, referred to also as right camera) 38 (see FIG. 2, not illustrated in FIG. 1) that is disposed on the right side of the upper surface of the outer shell of the engine chamber 6 and shoots the right side of the swing structure 3 and a camera (hereinafter, referred to also as rear camera) 39 that is disposed on the upper surface of the counterweight 9 and shoots the rear side of the swing structure 3.

The respective cameras 36, 37, 38, and 39 are, for example, wide-angle video cameras including an imaging element of a CCD (Charge Coupled Device), a CMOS (Complementary Metal Oxide Semiconductor), or the like excellent in the durability and the weather resistance and a wide-angle lens.

A speaker 79 that is a sound output device that outputs warning sounds, voices, and so forth is attached to the upper surface of the outer shell of the cab 7.

Disposed in the cab 7 are a machine controller 120 that controls basic operation of the work machine 1, an engine controller 130 that controls the revolution speed of the engine 20, an engine starting controller 110 that controls starting of the engine 20, a video controller 150 that transmits data of video shot by the photo shooting device 35 to a portable terminal 5 through a communication device 65 (see FIG. 2), and an object detection controller 140 that detects the existence of an object around the machine body 4 on the basis of a detection signal from the object detection device 30.

In the cab 7, an operation seat on which an operator sits, a plurality of operation devices for operating the work device 10, the track structure 2, and the swing structure 3, and an ignition switch (hereinafter, referred to as IG switch) 61 for starting the engine 20 are disposed. The IG switch 61 is a switch of a momentary operation type (self-return type) that becomes the on-state to output an on-operation signal to the engine starting controller 110 only while being pressed by a hand finger or the like, and returns to the off-state through separation of the hand finger or the like. The operator can start the engine 20 by executing on-operation (press operation) of the IG switch 61 and thereafter can operate the work machine 1 by operating the operation devices.

In the case of executing warm-up operation of the work machine 1, the operator of the work machine 1 can start the engine 20 by operating the portable terminal 5 from the outside of the work machine 1. The portable terminal 5 is an external information terminal that the operator of the work machine 1 carries. In the present embodiment, as one example, an example in which the portable terminal 5 is a smartphone will be described. The portable terminal 5 is not limited to the smartphone and may be a tablet PC, notebook PC, or the like. The portable terminal 5 includes a touch panel 51 that is a display device doubling as an input device, a communication device 66 for executing wireless communication with the work machine 1, a terminal controller 160 that controls the respective sections of the portable terminal 5, and a microphone 52 as a sound collecting device that collects voice of the operator.

The touch panel 51 is disposed in the front surface (front face) of the portable terminal 5. The touch panel 51 has the input device and the display device on which various kinds of information are displayed. The display device is a liquid crystal display, organic EL display, or the like and notifies a worker of various kinds of information by displaying a display image representing the various kinds of information on the display screen on the basis of a signal from the terminal controller 160. The input device is, for example, a touch sensor with which input operation with a hand finger, touch pen, or the like is possible, and inputs predetermined information to the terminal controller 160 in response to operation. The touch sensor is, for example, an input device of a well-known capacitive type that detects a position at which touch operation is made on the basis of change in the capacitance (charge) caused due to contact of a hand finger or the like.

Figure 2:
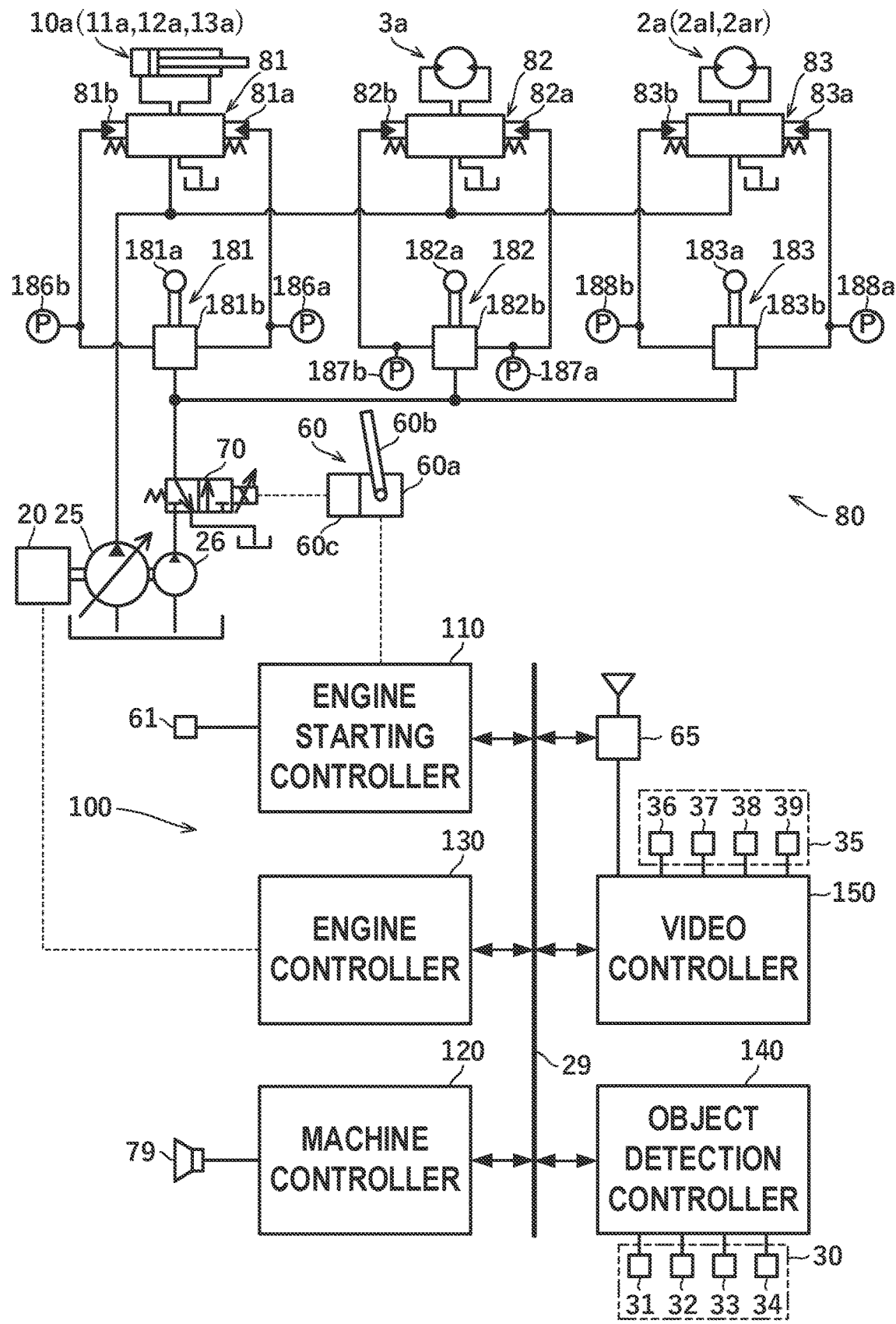
FIG. 2 is a diagram illustrating a hydraulic drive system of the work machine.

FIG. 2 is a diagram illustrating a hydraulic drive system 80 of the work machine 1. Hereinafter, the boom cylinder 11a, the arm cylinder 12a, and the bucket 13a will be generically referred to as a hydraulic cylinder 10a, and the left-side travelling hydraulic motor 2al and the right-side travelling hydraulic motor 2ar will be generically referred to as a travelling hydraulic motor 2a. Although a plurality of hydraulic cylinders 10a are disposed in the hydraulic drive system 80, one hydraulic cylinder 10a is illustrated as a representative in FIG. 2. Similarly, although the pair of travelling hydraulic motors 2ar and 2al are disposed in the hydraulic drive system 80, one travelling hydraulic motor 2a is illustrated as a representative in FIG. 2.

As illustrated in FIG. 2, the hydraulic drive system 80 includes the main pump 25 that is a variable displacement hydraulic pump driven by the engine 20, the pilot pump 26 that is a fixed displacement hydraulic pump driven by the engine 20, and a plurality of hydraulic actuators (hydraulic cylinders 10a, swing hydraulic motor 3a, and travelling hydraulic motors 2a) driven by a hydraulic operating fluid (pressurized fluid) delivered from the main pump 25. The hydraulic drive system 80 includes also control valves 81, 82, and 83 that control the flow direction and the flow rate of the hydraulic operating fluid supplied from the main pump 25 to the respective hydraulic actuators and a shut-off valve 70 that can interrupt the delivery pressure of the pilot pump 26.

The hydraulic operating fluid delivered from the pilot pump 26 is supplied to operation devices 181, 182, and 183. The operation device 181 makes a command of operation of the hydraulic cylinders 10a of the work device 10. The operation device 182 makes a command of operation of the swing hydraulic motor 3a. The operation device 183 makes a command of operation of the travelling hydraulic motors 2a.

The operation devices 181, 182, and 183 have operation levers 181a, 182a, and 183a operated through inclining by the operator and pairs of pressure reducing valves 181b, 182b, and 183b of a hydraulic pilot type. The operation devices 181, 182, and 183 reduce the delivery pressure of the pilot pump 26 that is a primary pressure to generate a secondary pressure (referred to also as operation pressure) according to the operation amount and the operation direction of the operation lever 181a, 182a, or 183a. The operation pressure thus generated is introduced to pressure receiving chambers 81a and 81b, 82a and 82b, or 83a and 83b of the control valve 81, 82, or 83 corresponding to the hydraulic actuator (10a, 3a, or 2a) and is used as a command (signal) that drives the control valve 81, 82, or 83 to operate the hydraulic actuator.

The hydraulic operating fluid delivered from the main pump 25 is supplied to the hydraulic actuators (hydraulic cylinders 10a, swing hydraulic motor 3a, and travelling hydraulic motors 2a) through the control valves 81, 82, and 83, and each of the work device 10, the swing structure 3, and the track structure 2 is driven.

In the work machine 1, operation sensors 186a, 186b, 187a, 187b, 188a, and 188b that sense operation of the operation device 181, 182, or 183 are disposed. In the present embodiment, the operation sensors 186a, 186b, 187a, 187b, 188a, and 188b are pressure sensors disposed on pilot lines that connect the operation device 181, 182, or 183 and the pressure receiving chamber 81a, 81b, 82a, 82b, 83a, or 83b of the control valve 81, 82, or 83. The operation sensors 186a, 186b, 187a, 187b, 188a, and 188b sense the operation pressure (operation amount) generated through operation of the operation lever 181a, 182a, or 183a by the operator. The operation sensors 186a, 186b, 187a, 187b, 188a, and 188b are connected to the machine controller 120 and output information relating to the sensed operation amount to the machine controller 120.

The shut-off valve 70 is disposed on a pilot line that connects the pilot pump 26 and the pressure reducing valves 181b, 182b, and 183b of the operation devices 181, 182, and 183. The shut-off valve 70 is a solenoid selector valve switched between a communication position with which supply of a pilot pressure from the pilot pump 26 to the pressure reducing valves 181b, 182b, and 183b is permitted and an interruption position with which the supply of the pilot pressure from the pilot pump 26 to the pressure reducing valves 181b, 182b, and 183b is prohibited. The shut-off valve 70 is operated by a lock lever device 60.

The lock lever device 60 has a lever part 60b selectively operated to a lock position (rising position) with which entry and exit to and from the cab 7 are permitted and operation of the hydraulic actuators (10a, 3a, and 2a) by the operation devices 181, 182, and 183 is made impossible, and a lock release position (lowering position) with which entry and exit to and from the cab 7 are prohibited and operation of the hydraulic actuators (10a, 3a, and 2a) by the operation devices 181, 182, and 183 is made possible. The lock lever device 60 has also a shut-off relay 60c for supplying or interrupting the power from the battery 28 and a lock lever operation sensor 60a that is an operation sensor to detect operation of the lever part 60b.

When the lever part 60b is operated to the lock release position, the shut-off relay 60c is turned on, that is, the shut-off relay 60c is set to the closed state, and the power is supplied from the battery 28 to the shut-off valve 70. When the power is supplied to the shut-off valve 70, the solenoid is excited and the shut-off valve 70 is switched to the communication position. Thus, in the state in which the lever part 60b exists at the lock release position, the operation pressure according to the operation amount of the operation lever 181a, 182a, or 183a is generated by the pressure reducing valves 181b, 182b, or 183b and the hydraulic actuator (10a, 3a, or 2a) corresponding to the operated operation lever 181a, 182a, or 183a operates.

When the lever part 60b is operated to the lock position, the shut-off relay 60c is turned off, that is, the shut-off relay 60c is set to the open state, and the supply of the power from the battery 28 to the shut-off valve 70 is interrupted. When the supply of the power to the shut-off valve 70 is interrupted, the solenoid is demagnetized and the shut-off valve 70 is switched to the interruption position. Due to this, the primary pressure of the pilot pump 26 to the pressure reducing valves 181b, 182b, and 183b is interrupted and operation by the operation levers 181a, 182a, and 183a is disabled.

The lock lever operation sensor 60a senses the operation position of the lever part 60b and outputs a signal representing the sensing result to the engine starting controller 110.

Figure 3:
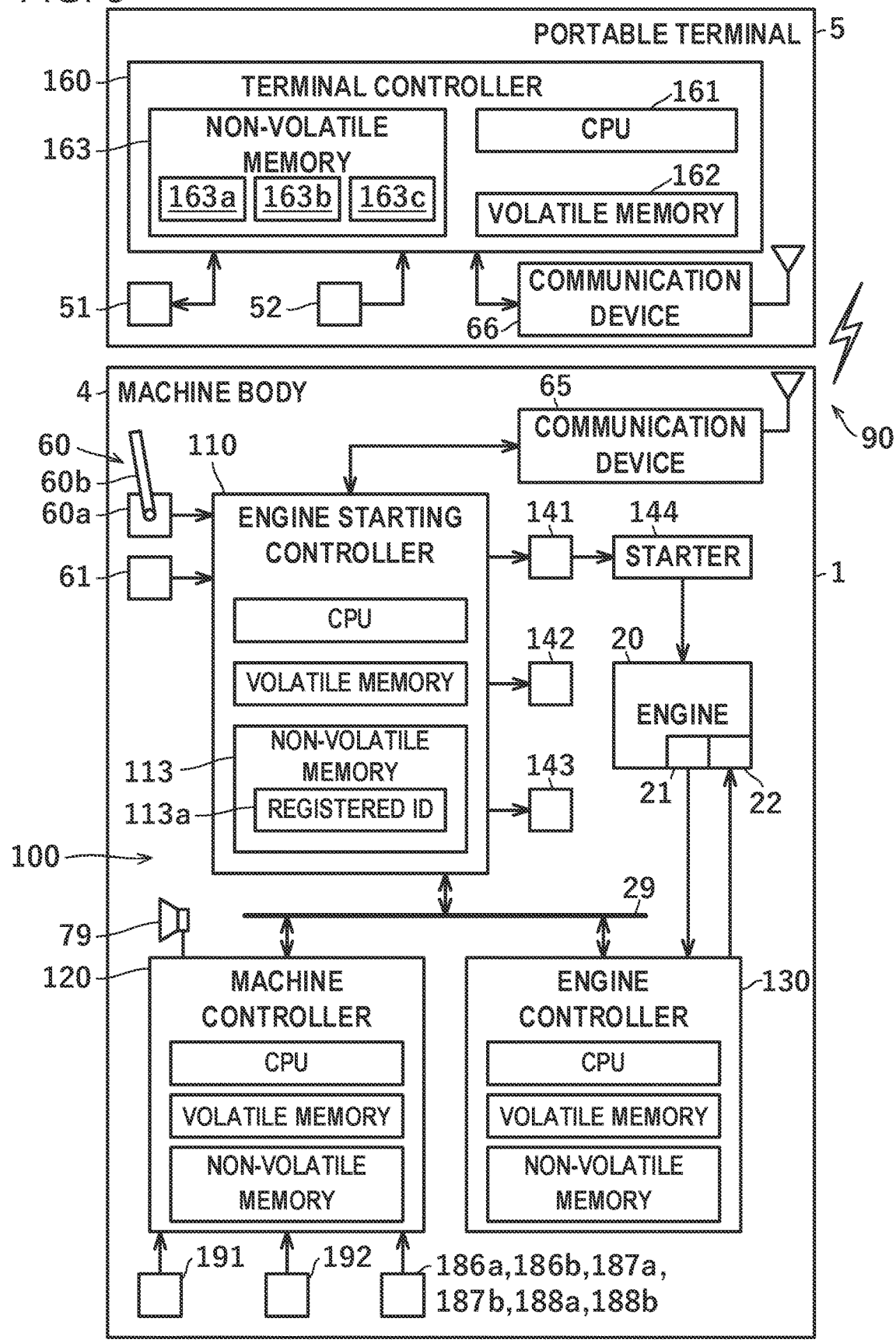
FIG. 3 is a diagram illustrating the configuration of a remote operation system.

With reference to FIG. 3, a remote operation system 90 that is a system to remotely operate the engine 20 of the work machine 1 by the portable terminal 5 will be described. FIG. 3 is a diagram illustrating the configuration of the remote operation system 90. As illustrated in FIG. 3, the remote operation system 90 includes a controller 100 that controls the work machine 1 and the portable terminal 5 that gives and receives information with the controller 100 by wireless communication.

The terminal controller 160 of the portable terminal 5 is configured by a microcomputer including a CPU (Central Processing Unit) 161 as a processing device, a volatile memory 162 referred to as a commonly-called RAM (Random Access Memory) as a storage device, a non-volatile memory 163 such as an EEPROM or flash memory as a storage device, an input/output interface (I/O interface) that is not illustrated, and other peripheral circuits.

Programs that can execute various computations are stored in the non-volatile memory 163 of the terminal controller 160. That is, the non-volatile memory 163 of the terminal controller 160 is a storage medium that can read programs that implement functions of the present embodiment.

A plurality of applications including a starting application 163c and a support program (OS) 163b that supports operation of the applications are included in the programs stored in the non-volatile memory 163. The starting application 163c is an application for starting the engine 20 of the work machine 1. The starting application 163c operates under management by the support program 163b. Furthermore, a key ID 163a that is authentication information used for key authentication processing of the portable terminal 5 is stored in the non-volatile memory 163. The key ID 163a is identification information unique to the portable terminal 5.

The terminal controller 160 transmits the key ID 163a and a command for starting the engine 20 (hereinafter, referred to also as engine starting command) to the machine body 4 by the communication device 66.

Although not illustrated, when touch operation of an icon of the starting application 163c displayed on a home screen of the touch panel 51 is executed, the terminal controller 160 executes the starting application 163c. When the starting application 163c is executed, the terminal controller 160 causes the display screen of the touch panel 51 to display a warm-up switch 51a (see FIG. 1).

When touch operation of the warm-up switch 51a is executed, the terminal controller 160 generates the engine starting command and transmits the generated engine starting command to the machine body 4 through the communication device 66. As described later, the engine starting controller 110 controls the starting of the engine 20 on the basis of the engine starting command acquired from the portable terminal 5 through the communication device 65. Therefore, the operator can start the engine 20 from a place far away from the work machine 1 and execute warm-up operation of the engine 20 by executing the touch operation of the warm-up switch 51a.

When the starting of the engine 20 has succeeded on the basis of the engine starting command from the portable terminal 5 and the terminal controller 160 receives a starting success signal representing that the starting of the engine 20 has succeeded from the machine body 4, the terminal controller 160 displays a message, icon, or the like representing that warp-up operation has been started on the touch panel 51.

The terminal controller 160 causes the touch panel 51 to display video of the surroundings of the machine body 4 of the work machine 1 on the basis of data of video transmitted from the work machine 1.

As illustrated in FIG. 2 and FIG. 3, the controller 100 includes the engine starting controller 110, the machine controller 120, the engine controller 130, the object detection controller 140, and the video controller 150. The engine starting controller 110 is a controller that controls starting and stop of the engine 20. The machine controller 120 is a controller that comprehensively controls the respective parts of the machine body. The engine controller 130 is a controller that controls the revolution speed of the engine 20. The object detection controller 140 is a controller that detects an object around the machine body 4 and computes the distance to the detected object on the basis of a detection signal from the detection sensors 31 to 34. The video controller 150 is a controller that transmits data of video shot by the cameras 36 to 39 to the portable terminal 5 through the communication device 65.

The respective controllers 110, 120, 130, 140, and 150 are configured by a microcomputer including a CPU as a processing device, a volatile memory referred to as a commonly-called RAM as a storage device, a non-volatile memory such as an EEPROM, flash memory, or hard disk drive as a storage device, an input/output interface (I/O interface) that is not illustrated, and other peripheral circuits. The respective controllers 110, 120, 130, 140, and 150 may be configured by one microcomputer or may be configured by a plurality of microcomputers. Moreover, another controller may be caused to have part or all of the functions of the controllers 110, 120, 130, 140, and 150. Programs that can execute various computations are stored in the non-volatile memories of the respective controllers 110, 120, 130, 140, and 150. That is, the non-volatile memories of the respective controllers 110, 120, 130, 140, and 150 are storage media that can read programs that implement functions of the present embodiment.

The respective controllers 110, 120, 130, 140, and 150 are connected to be capable of mutual communication through an in-machine network 29 referred to as a CAN (Controller Area Network). For the in-machine network 29, a communication standard other than the CAN, for example, Ethernet (registered trademark), may be used.

As illustrated in FIG. 3, the machine controller 120 controls operation of pieces of equipment mounted in the work machine 1 on the basis of signals from the operation sensors 186a, 186b, 187a, 187b, 188a, and 188b and various sensors 191. In the various sensors 191, for example, a pressure sensor disposed in the hydraulic drive system 80, a posture sensor that senses the posture of the work device 10, and so forth are included.

The engine controller 130 adjusts the injection amount of a fuel injected into a cylinder of the engine 20 by a fuel injection device 22 and controls the engine revolution speed. An engine control dial 192 as an engine revolution speed setting device that sets the maximum target revolution speed of the engine 20 is connected to the machine controller 120. The machine controller 120 computes a target revolution speed of the engine 20 on the basis of an operation signal of the engine control dial 192 disposed in the cab 7, and so forth, and outputs the target revolution speed to the engine controller 130.

A revolution speed sensor 21 that senses the revolution speed of the engine 20 is disposed for the engine 20 and outputs the sensed revolution speed (actual revolution speed) of the engine 20 to the engine controller 130. The engine controller 130 controls the fuel injection device 22 to cause the actual revolution speed of the engine 20 sensed by the revolution speed sensor 21 to become the target revolution speed input from the machine controller 120.

The engine starting controller 110 controls activation and stop of the machine controller 120 and the engine controller 130 on the basis of a signal from the IG switch 61 or the portable terminal 5. The engine starting controller 110 controls activation (starting) and stop of the engine 20 on the basis of the signal from the IG switch 61 or the portable terminal 5.

Furthermore, the engine starting controller 110 controls the stop of the engine 20 on the basis of signals from the operation devices 60, 181, 182, and 183. In a non-volatile memory 113 of the engine starting controller 110, the identification information (key ID) unique to the portable terminal 5 is stored as registered information (registered ID 113a).

The engine starting controller 110 acquires, through the in-machine network 29, sensing results in the operation sensors 186a, 186b, 187a, 187b, 188a, and 188b acquired by the machine controller 120. Moreover, the engine starting controller 110 acquires, through the in-machine network 29, a sensing result in the revolution speed sensor 21 acquired by the engine controller 130.

The engine starting controller 110 executes starting control of the engine 20 when a first starting condition or a second starting condition is satisfied. The first starting condition includes the match between the key ID 163a transmitted from the portable terminal 5 and the registered ID 113a, the existence of the portable terminal 5 in the cab 7, and operation of the IG switch 61. The second starting condition includes the match between the key ID 163a transmitted from the portable terminal 5 and the registered ID 113a, the existence of the portable terminal 5 outside the cab 7, and acquisition of the engine starting command transmitted from the portable terminal 5. Moreover, the engine starting controller 110 executes stop control of the engine 20 when a predetermined condition is satisfied.

A starter relay 141, an ACC relay 142, and an IG relay 143 are connected to the engine starting controller 110. The starter relay 141 is a relay for supplying or interrupting the power from the battery 28 for a starter motor 144 that activates the engine 20. When the starter relay 141 is turned on, that is, when the starter relay 141 becomes the closed state, the power is supplied from the battery 28 to the starter motor 144 and the starter motor 144 operates, so that the engine 20 is driven by the starter motor 144. When the starter relay 141 is turned off, that is, when the starter relay 141 becomes the open state, the supply of the power from the battery 28 to the starter motor 144 is interrupted.

The ACC relay 142 is a relay for supplying or interrupting the power from the battery 28 for devices of an accessory (ACC) system, such as radio and audio instrument and a monitor controller that controls a display device that is not illustrated. When the ACC relay 142 is turned on, that is, when the ACC relay 142 becomes the closed state, the power is supplied from the battery 28 to the devices of the accessory system and the monitor controller. When the ACC relay 142 is turned off, that is, when the ACC relay 142 becomes the open state, the supply of the power from the battery 28 to the devices of the accessory system and the monitor controller is interrupted.

The IG relay 143 is a relay for supplying or interrupting the power from the battery 28 for devices of an ignition (IG) system, such as an air conditioner, and the machine controller 120, the engine controller 130, the object detection controller 140, and the video controller 150. When the IG relay 143 is turned on, that is, when the IG relay 143 becomes the closed state, the power is supplied from the battery 28 to the devices of the ignition system and the controllers 120, 130, 140, and 150. When the IG relay 143 is turned off, that is, when the IG relay 143 becomes the open state, the supply of the power from the battery 28 to the devices of the ignition system and the controllers 120, 130, 140, and 150 is interrupted.

The communication devices 65 and 66 have a communication interface including a communication antenna that uses a band such as the 2.4 GHz band or the 5 GHz band as the reception band. The communication device 65 mounted in the machine body (work machine main body) 4 directly communicates with the communication device 66 mounted in the portable terminal 5 to give and receive information (data). The communication device 65 of the machine body 4 executes wireless communication with the communication device 66 of the portable terminal 5 on the basis of Wi-Fi (registered trademark), which is a wireless communication system based on the IEEE (The Institute of Electrical and Electronics Engineers, Inc.) 802.11 standard, for example. The communication system is not limited thereto and it is also possible to employ a communication system such as ZigBee (registered trademark) or Bluetooth (registered trademark).

Furthermore, the communication devices 65 and 66 may indirectly give and receive information by executing communication through a communication line 99 (see FIG. 1) that is a broad area network. The communication line 99 is the Internet, a mobile phone communication network (mobile communication network) of 4G, 5G, or the like, a LAN (Local Area Network), a WAN (Wide Area Network), or the like.

Figure 4:
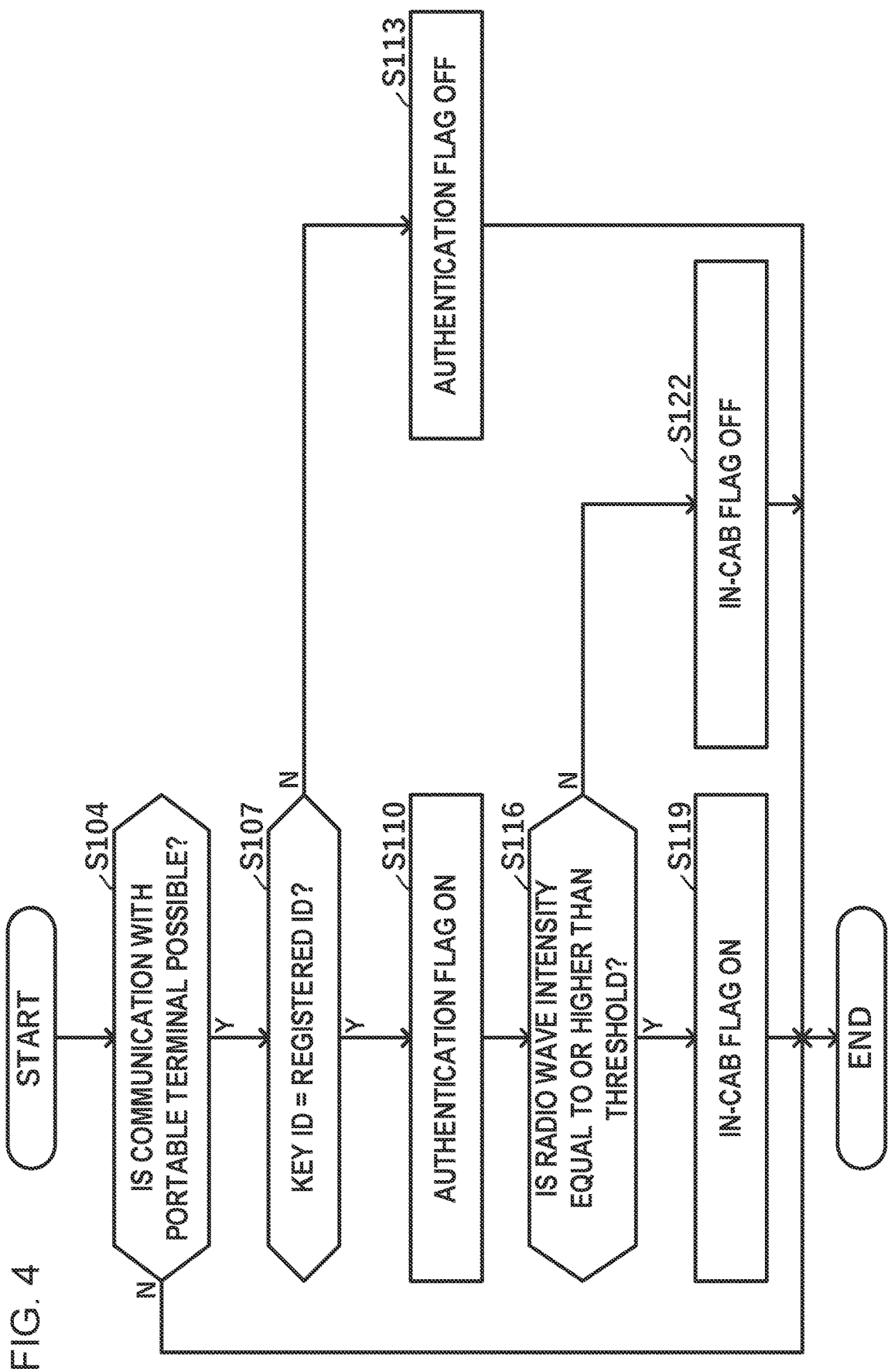
FIG. 4 is a flowchart illustrating the contents of existence determination processing about a portable terminal executed by an engine starting controller of the work machine.

The engine starting controller 110 executes existence determination (position determination) of whether the portable terminal 5 exists in the cab 7 or exists outside the cab 7 on the basis of the intensity of radio waves directly transmitted from the portable terminal 5 to the communication device 65. With reference to FIG. 4, existence determination processing about the portable terminal 5 executed by the engine starting controller 110 of the work machine 1 will be described.

FIG. 4 is a flowchart illustrating the contents of the existence determination processing about the portable terminal 5 executed by the engine starting controller 110 of the work machine 1. The processing of the flowchart illustrated in FIG. 4 is initiated by connection of the battery 28 to the engine starting controller 110 and is repeatedly executed at a predetermined control cycle. The engine starting controller 110 and the battery 28 are connected by a normally-closed relay that is usually in the closed state.

As illustrated in FIG. 4, in a step S104, the engine starting controller 110 determines whether or not communication with the portable terminal 5 is possible. In the step S104, when radio waves transmitted from the portable terminal 5 have been received by the communication device 65, the engine starting controller 110 determines that communication with the portable terminal 5 is possible, and proceeds to a step S107. In the step S104, when radio waves transmitted from the portable terminal 5 have not been received by the communication device 65, the engine starting controller 110 determines that communication with the portable terminal 5 is impossible, and ends the processing illustrated in the flowchart of FIG. 4.

In the step S107, the engine starting controller 110 executes key authentication processing to determine whether or not the key ID 163a included in data that has been transmitted from the portable terminal 5 and been acquired through the communication device 65 matches the registered ID 113a registered in the non-volatile memory 113 in advance. When it is determined that the acquired key ID 163a matches the registered ID 113a in the step S107, the engine starting controller 110 considers that the key authentication has succeeded, and proceeds to a step S110. When it is determined that the acquired key ID 163a does not match the registered ID 113a in the step S107, the engine starting controller 110 considers that the key authentication has failed, and proceeds to a step S113.

The engine starting controller 110 sets an authentication flag representing that the key authentication has succeeded to the on-state in the step S110 and proceeds to a step S116. The engine starting controller 110 sets the authentication flag to the off-state in the step S113 and ends the processing illustrated in the flowchart of FIG. 4.

In the step S116, the engine starting controller 110 determines whether or not the portable terminal 5 exists in the cab 7 on the basis of the intensity (reception intensity) of radio waves that have been transmitted from the portable terminal 5 and been received by the communication device 65.

In the step S116, when the intensity of the radio waves that have been transmitted from the portable terminal 5 and been received by the communication device 65 is equal to or higher than an intensity threshold, the engine starting controller 110 determines that the portable terminal 5 exists in the cab 7, and proceeds to a step S119. In the step S116, when the intensity of the radio waves that have been transmitted from the portable terminal 5 and been received by the communication device 65 is lower than the intensity threshold, the engine starting controller 110 determines that the portable terminal 5 exists outside the cab 7, and proceeds to a step S122. The intensity threshold is a threshold used for determining whether or not the portable terminal 5 exists in the cab 7, and is stored in the non-volatile memory 113 of the engine starting controller 110 in advance. This intensity threshold can be settled from a value measured by an experiment or the like in advance.

The engine starting controller 110 sets an in-cab flag representing that the portable terminal 5 exists in the cab 7 to the on-state in the step S119 and ends the processing illustrated in the flowchart of FIG. 4. The engine starting controller 110 sets the in-cab flag to the off-state in the step S122 and ends the processing illustrated in the flowchart of FIG. 4.

Figure 5:
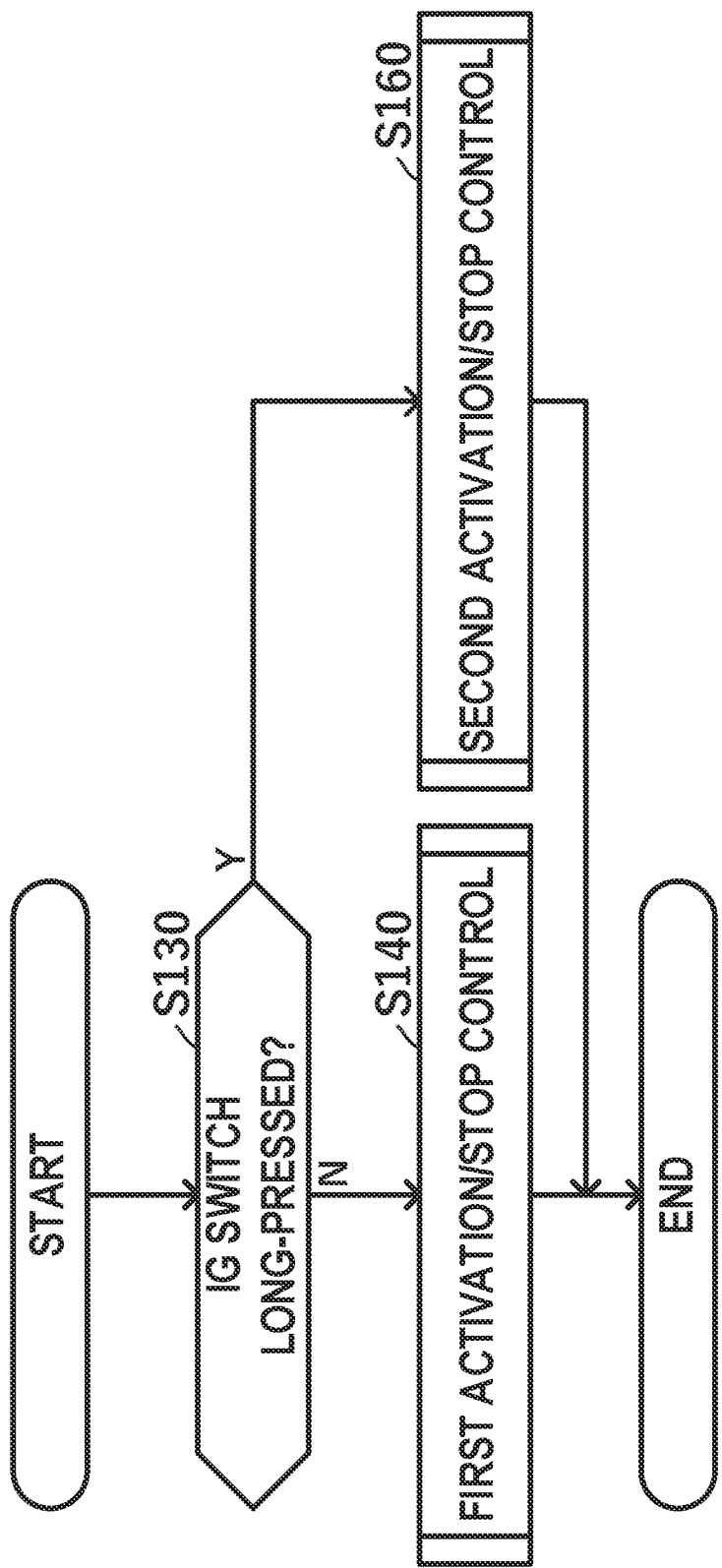
FIG. 5 is a flowchart illustrating the contents of control selection processing executed by the engine starting controller of the work machine.
Figure 6:
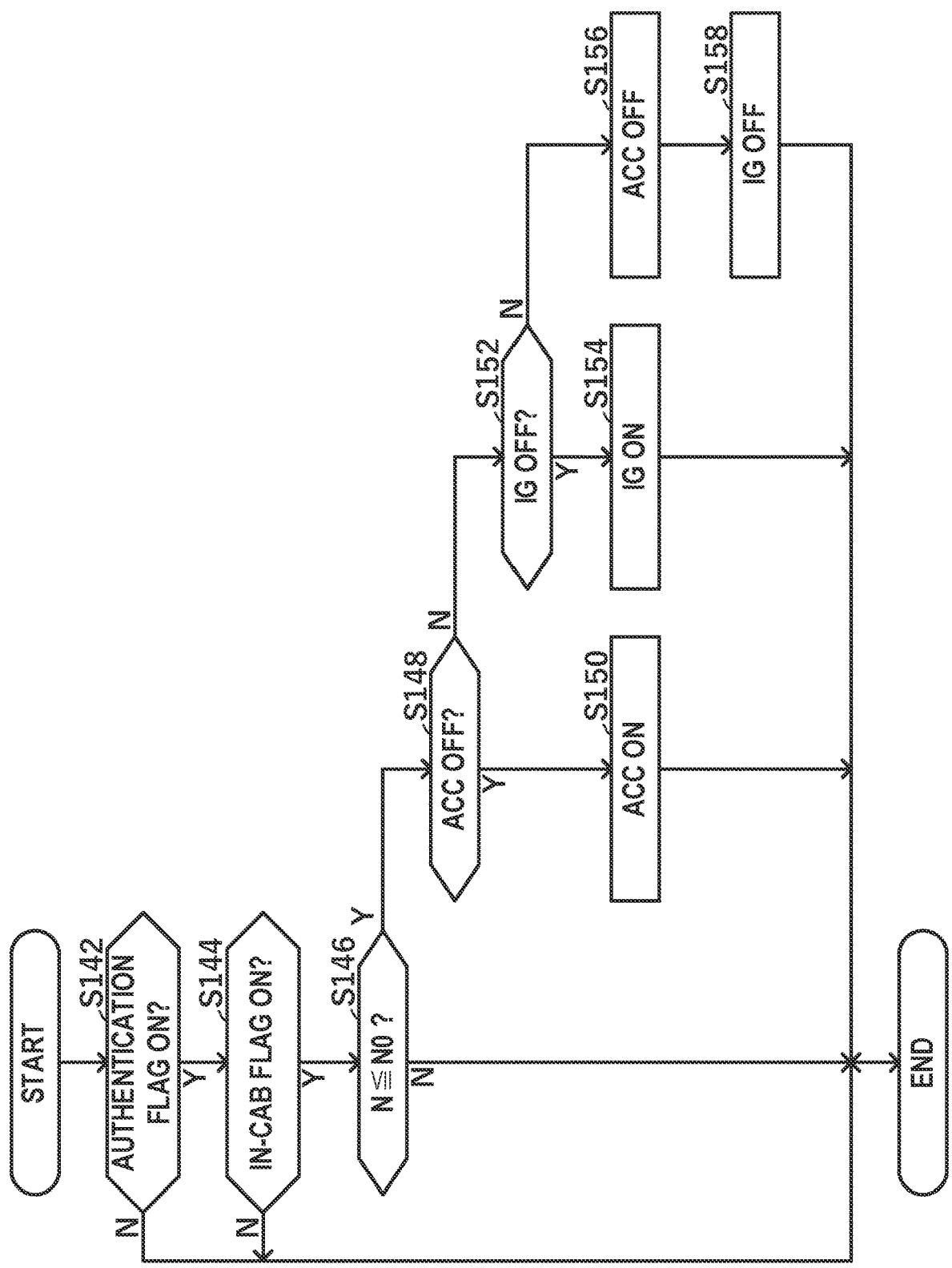
FIG. 6 is a flowchart illustrating the contents of first activation/stop control executed by the engine starting controller of the work machine.
Figure 7:
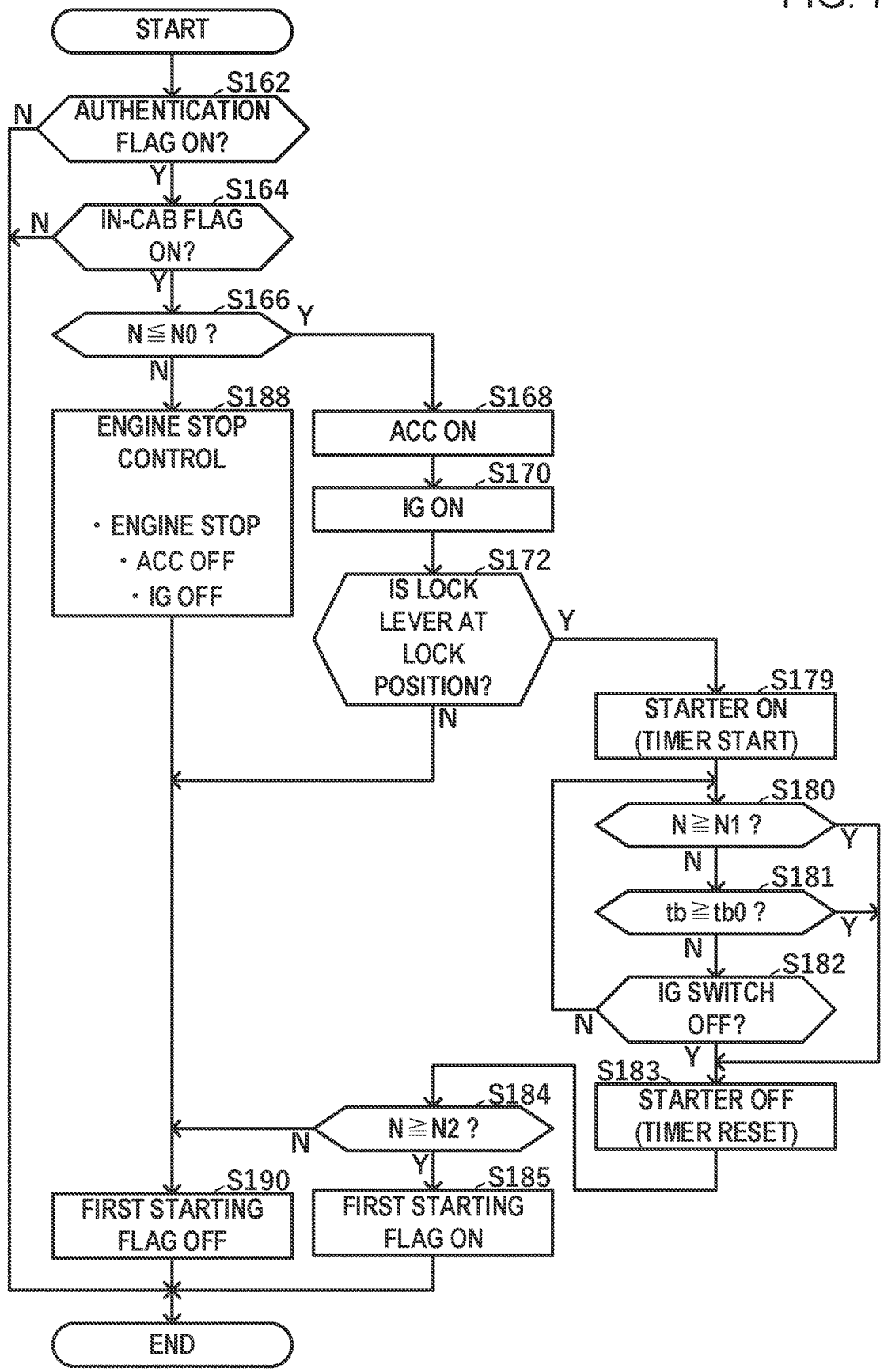
FIG. 7 is a flowchart illustrating the contents of second activation/stop control executed by the engine starting controller of the work machine.

When the portable terminal 5 that has succeeded in the key authentication exists in the cab 7, the engine starting controller 110 executes control of activation and stop of the engine 20 and the controllers 120, 130, 140, and 150 of the work machine 1 in response to operation of the IG switch 61 disposed in the cab 7. When long-press operation of the IG switch 61 is executed when the engine is stopped, the engine starting controller 110 turns on the ACC relay 142 and the IG relay 143 and starts the engine 20 by turning on the starter relay 141 to drive the starter motor 144. Furthermore, when long-press operation of the IG switch 61 is executed when the engine is operating, the engine starting controller 110 turns off the ACC relay 142 and the IG relay 143 and stops the engine 20. Moreover, the engine starting controller 110 controls turning-on/off of the ACC relay 142 and the IG relay 143 when short-press operation of the IG switch 61 is executed when the engine is stopped. With reference to FIG. 5 to FIG. 7, activation/stop control processing of the work machine 1 based on operation of the IG switch 61, executed by the engine starting controller 110 of the work machine 1, will be described.

FIG. 5 is a flowchart illustrating the contents of control selection processing executed by the engine starting controller 110 of the work machine 1. The processing illustrated in FIG. 5 is initiated by on-operation of the IG switch 61.

Although not illustrated, when the on-operation of the IG switch 61 is executed, the engine starting controller 110 measures the time for which the on-operation of the IG switch 61 is executed by a timer function. When the on-operation of the IG switch 61 is released, the engine starting controller 110 executes reset processing of the measured time (hereinafter, referred to as on-operation time ta) (ta=0).

As illustrated in FIG. 5, in a step S130, the engine starting controller 110 determines whether long-press operation of the IG switch 61 has been executed or short-press operation thereof has been executed on the basis of the on-operation time ta of the IG switch 61. In the step S130, when the on-operation signal from the IG switch 61 is continuously input and the on-operation time ta becomes equal to or longer than a threshold ta0, the engine starting controller 110 determines that long-press operation of the IG switch 61 has been executed, and proceeds to a step S160. In the step S130, when the on-operation of the IG switch 61 is released before the on-operation time ta reaches the threshold ta0, the engine starting controller 110 determines that short-press operation of the IG switch 61 has been executed, and proceeds to a step S140. The threshold ta0 is a threshold for determining whether or not long-press operation of the IG switch 61 has been executed, and is stored in the non-volatile memory 113 in advance. As the threshold ta0, for example, a value of approximately 500 [msec] is employed.

The engine starting controller 110 executes first activation/stop control in the step S140 and executes second activation/stop control in the step S160. When the first activation/stop control ends in the step S140, the processing illustrated in the flowchart of FIG. 5 ends. When the second activation/stop control ends in the step S160, the processing illustrated in the flowchart of FIG. 5 ends.

FIG. 6 is a flowchart illustrating the contents of the first activation/stop control (step S140 in FIG. 5) executed by the engine starting controller 110 of the work machine 1. As illustrated in FIG. 6, in a step S142, the engine starting controller 110 determines whether or not the authentication flag is set to the on-state. When it is determined that the authentication flag is set to the on-state in the step S142, the processing proceeds to a step S144. When it is determined that the authentication flag is set to the off-state, the first activation/stop control illustrated in FIG. 6 ends.

In the step S144, the engine starting controller 110 determines whether or not the in-cab flag is set to the on-state. When it is determined that the in-cab flag is set to the on-state in the step S144, the processing proceeds to a step S146. When it is determined that the in-cab flag is set to the off-state, the first activation/stop control illustrated in FIG. 6 ends.

In the step S146, the engine starting controller 110 determines whether or not the engine 20 is stopped (that is, whether or not the engine 20 is operating) on the basis of an actual revolution speed N of the engine 20 sensed by the revolution speed sensor 21. In the step S146, when the actual revolution speed N of the engine 20 is equal to or lower than a threshold N0, the engine starting controller 110 determines that the engine 20 is stopped, and proceeds to a step S148. In the step S146, when the actual revolution speed N of the engine 20 is higher than the threshold N0, the engine starting controller 110 determines that the engine 20 is operating, and ends the first activation/stop control illustrated in FIG. 6.

The threshold N0 is a threshold for determining whether the engine 20 is stopped or operating, and is stored in the non-volatile memory 113 (see FIG. 3) of the engine starting controller 110 in advance. As the threshold N0, for example, a value that is a value smaller than the minimum revolution speed that can be set by the engine control dial 192 (see FIG. 3) and is equal to or larger than 0 (zero) (for example, 0 to several revolutions per minute) is set.

In the step S148, the engine starting controller 110 determines whether or not the ACC relay 142 is in the off-state (open state). When it is determined that the ACC relay 142 is in the off-state in the step S148, the processing proceeds to a step S150. When it is determined that the ACC relay 142 is not in the off-state (is in the on-state) in the step S148, the processing proceeds to a step S152.

The engine starting controller 110 generates a command for turning on the ACC relay 142 and outputs the command to the ACC relay 142 in the step S150, and ends the first activation/stop control illustrated in FIG. 6. This causes the work machine 1 to become the ACC-on state.

In the step S152, the engine starting controller 110 determines whether or not the IG relay 143 is in the off-state (open state). When it is determined that the IG relay 143 is in the off-state in the step S152, the processing proceeds to a step S154. When it is determined that the IG relay 143 is not in the off-state (is in the on-state) in the step S152, the processing proceeds to a step S156.

The engine starting controller 110 generates a command for turning on the IG relay 143 and outputs the command to the IG relay 143 in the step S154, and ends the first activation/stop control illustrated in FIG. 6. This causes the work machine 1 to become the key-on state.

The engine starting controller 110 generates a command for turning off the ACC relay 142 and outputs the command to the ACC relay 142 in the step S156, and proceeds to a step S158. The engine starting controller 110 generates a command for turning off the IG relay 143 and outputs the command to the IG relay 143 in the step S158, and ends the first activation/stop control illustrated in FIG. 6. This causes the work machine 1 to become the key-off state.

FIG. 7 is a flowchart illustrating the contents of the second activation/stop control (step S160 in FIG. 5) executed by the engine starting controller 110 of the work machine 1. As illustrated in FIG. 7, in a step S162 (key authentication processing), the engine starting controller 110 determines whether or not the authentication flag is set to the on-state. When it is determined that the authentication flag is set to the on-state in the step S162, the processing proceeds to a step S164. When it is determined that the authentication flag is set to the off-state, the second activation/stop control illustrated in FIG. 7 ends.

In the step S164, the engine starting controller 110 determines whether or not the in-cab flag is set to the on-state. When it is determined that the in-cab flag is set to the on-state in the step S164, the processing proceeds to a step S166. When it is determined that the in-cab flag is set to the off-state, the second activation/stop control illustrated in FIG. 7 ends.

In the step S166, the engine starting controller 110 determines whether or not the engine 20 is stopped (that is, whether or not the engine 20 is operating) on the basis of the actual revolution speed N of the engine 20 sensed by the revolution speed sensor 21. In the step S166, when the actual revolution speed N of the engine 20 is equal to or lower than the threshold N0, the engine starting controller 110 determines that the engine 20 is stopped, and proceeds to a step S168. In the step S166, when the actual revolution speed N of the engine 20 is higher than the threshold N0, the engine starting controller 110 determines that the engine 20 is operating, and proceeds to a step S188.

The engine starting controller 110 generates a command for turning on the ACC relay 142 and outputs the command to the ACC relay 142 in the step S168, and proceeds to a step S170. The engine starting controller 110 generates a command for turning on the IG relay 143 and outputs the command to the IG relay 143 in the step S170, and proceeds to a step S172.

In the step S172, the engine starting controller 110 determines whether or not the lock lever device 60 has been operated to the lock position on the basis of a signal representing the sensing result from the lock lever operation sensor 60a. When it is determined that the lock lever device 60 has been operated to the lock position in the step S172, the processing proceeds to a step S179. When it is determined that the lock lever device 60 has not been operated to the lock position (that is, has been operated to the lock release position), the processing proceeds to a step S190.

The engine starting controller 110 generates a command for turning on the starter relay 141 and outputs the command to the starter relay 141 in the step S179, and proceeds to a step S180. Furthermore, in the step S179, the engine starting controller 110 starts measurement of the time for which the starter relay 141 is set to the on-state (hereinafter, referred to as starter-on time tb) by the timer function. The command for turning on the starter relay 141 is output also to the engine controller 130 and starting control of the engine 20 with use of the fuel injection device 22 is started by the engine controller 130.

In the step S180, the engine starting controller 110 determines whether or not the starting of the engine 20 has been completed on the basis of the actual revolution speed N of the engine 20 sensed by the revolution speed sensor 21. In the step S180, when the actual revolution speed N of the engine 20 is equal to or higher than a threshold N1, the engine starting controller 110 determines that the starting of the engine 20 has been completed, and proceeds to a step S183. In the step S180, when the actual revolution speed N of the engine 20 is lower than the threshold N1, the engine starting controller 110 determines that the starting of the engine 20 has not been completed, and proceeds to a step S181.

The threshold N1 is a threshold for determining whether or not the starting of the engine 20 has been completed, and is stored in the non-volatile memory 113 (see FIG. 3) of the engine starting controller 110 in advance. As the threshold N1, for example, the same value as the minimum revolution speed that can be set by the engine control dial 192 (see FIG. 3) is set.

In the step S181, the engine starting controller 110 determines whether or not the starter-on time tb is equal to or longer than a threshold tb0. When it is determined that the starter-on time tb is equal to or longer than the threshold tb0 in the step S181, the processing proceeds to the step S183. When it is determined that that the starter-on time tb is shorter than the threshold tb0, the processing proceeds to a step S182. The threshold tb0 is a threshold set for preventing continuous use of the starter motor 144 and is stored in the non-volatile memory 113 in advance. As the threshold tb0, for example, a value of approximately 30 [sec] is employed.

In the step S182, the engine starting controller 110 determines whether or not the on-operation of the IG switch 61 has been released, that is, whether or not off-operation of the IG switch 61 has been executed. When it is determined that the on-operation of the IG switch 61 has been released in the step S182, the processing proceeds to the step S183. When it is determined that the on-operation of the IG switch 61 has not been released, the processing returns to the step S180.

The engine starting controller 110 generates a command for turning off the starter relay 141 and outputs the command to the starter relay 141 in the step S183, and proceeds to a step S184. Moreover, in the step S183, the engine starting controller 110 executes reset processing of the measured starter-on time tb (tb=0). The command for turning off the starter relay 141 is output also to the engine controller 130 and the starting control of the engine 20 with use of the fuel injection device 22 by the engine controller 130 ends.

In the step S184, the engine starting controller 110 determines whether or not the starting of the engine 20 has succeeded on the basis of the actual revolution speed N of the engine 20. In the step S184, when the actual revolution speed N of the engine 20 is equal to or higher than a threshold N2, the engine starting controller 110 determines that the starting of the engine 20 has succeeded, and proceeds to a step S185. In the step S184, when the actual revolution speed N of the engine 20 is lower than the threshold N2, the engine starting controller 110 determines that the starting of the engine 20 has failed, and proceeds to the step S190.

The threshold N2 is a threshold for determining whether or not the starting of the engine 20 has succeeded, and is stored in the non-volatile memory 113 (see FIG. 3) of the engine starting controller 110 in advance. As the threshold N2, for example, the same value as the minimum revolution speed that can be set by the engine control dial 192 (see FIG. 3) is set. Although the threshold N1 and the threshold N2 are the same value in the present embodiment, they may be set to different values.

The engine starting controller 110 sets a first starting flag representing that the starting of the engine 20 by the on-operation of the IG switch 61 has succeeded to the on-state in the step S185, and ends the second activation/stop control illustrated in FIG. 7. The engine starting controller 110 sets the first starting flag to the off-state in the step S190, and ends the second activation/stop control illustrated in FIG. 7.

When it is determined that the engine 20 is operating in the step S166, the processing proceeds to the step S188. The engine starting controller 110 executes engine stop control in the step S188. In the engine stop control, the engine starting controller 110 generates a stop command and outputs the stop command to the engine controller 130 to end the control of the fuel injection device 22 by the engine controller 130 and stop the engine 20. In the engine stop control, the engine starting controller 110 generates a command for turning off the ACC relay 142 and outputs the command to the ACC relay 142 to turn off the ACC relay 142. In the engine stop control, the engine starting controller 110 generates a command for turning off the IG relay 143 and outputs the command to the IG relay 143 to turn off the IG relay 143. This stops the engine 20, the machine controller 120, the engine controller 130, the object detection controller 140, and the video controller 150.

As above, in the present embodiment, when the portable terminal 5 exists in the cab 7, the engine starting controller 110 starts the engine 20 on condition that the key authentication of the portable terminal 5 has succeeded, that the engine 20 is stopped, that the lock lever device 60 has been operated to the lock position, and that long-press operation of the IG switch 61 disposed in the cab 7 is executed.

In the present embodiment, operation of the IG switch 61 becomes valid only when the authentication of the portable terminal 5 has succeeded and the portable terminal 5 exists in the cab 7. That is, the engine 20 can be started and stopped by operation of the IG switch 61 only in a case in which the operator who possesses the portable terminal 5 rides in the cab 7. In other words, even when a third party who does not possess the portable terminal 5 operates the IG switch 61, it is impossible to start and stop the engine 20. Thus, theft of the work machine 1 by a third party can be prevented.

When the portable terminal 5 exists outside the cab 7, the engine starting controller 110 executes control of activation (starting) and stop of the engine 20 on the basis of the key ID 163a transmitted from the portable terminal 5 and the engine starting command transmitted from the portable terminal 5 through on-operation of the warm-up switch 51a of the portable terminal 5. When long-press operation of the warm-up switch 51a displayed on the touch panel 51 of the portable terminal 5 is executed when the engine is stopped, the engine starting controller 110 turns on the ACC relay 142 and the IG relay 143 and starts the engine 20 by turning on the starter relay 141 to drive the starter motor 144. Furthermore, when long-press operation of the warm-up switch 51a is executed when the engine is operating, the engine starting controller 110 turns off the ACC relay 142 and the IG relay 143 and stops the engine 20.

For the work machine 1, inspection work is executed before starting of the engine 20. In the inspection work, check work of the amounts of engine oil, hydraulic operating fluid, and cooling water, check work of whether or not oil leakage of a hydraulic actuator exists, and so forth are included. In the case of remotely starting the engine 20 of the work machine 1, the operator oneself can not execute the inspection work of the work machine 1 and a worker other than the operator executes the inspection work of the work machine 1.

As illustrated in FIG. 1, the work machine 1 includes movable parts such as the cooling fan 27 that is directly connected to the engine 20 and rotates in conjunction with the rotation of the engine 20. Thus, if the engine 20 of the work machine 1 is remotely started in the inspection work of the work machine 1 by the worker, there is a possibility that the cooling fan 27 gets contact with the worker. Thus, when the engine 20 is started, the contact between the worker and the movable part such as the cooling fan 27 needs to be prevented. Furthermore, power is supplied from the battery 28 to electrical components due to the starting of the engine 20. Therefore, the contact between the worker and the electrical component also needs to be prevented.

The controller 100 of the work machine 1 according to the present embodiment determines whether or not an object exists around the machine body 4 on the basis of the detection signal arising from detection by the object detection device 30. When it is determined that an object exists around the machine body 4, the controller 100 does not start the engine 20 even when the engine starting command is acquired from the portable terminal 5 through the communication device 65.

Thus, it is possible to prevent the contact of the movable part or the electrical component with the worker due to the starting of the engine 20 when the worker is executing work of inspection or the like around the machine body 4 of the work machine 1. However, if the remote starting of the engine 20 is always prohibited when a worker exists around the machine body 4, there is a possibility that the start time of work is delayed and the work efficiency lowers. Here, a situation in which the engine 20 may be started even when a worker exists around the machine body 4 of the work machine 1 possibly occurs. For example, when a worker is not located near the cooling fan 27 or the electrical component, the worker does not get contact with the cooling fan 27 or the electrical component even when the engine 20 is started.

Thus, in a case in which the engine starting command has been acquired from the portable terminal 5 through the communication device 65 and when it is determined that an object exists around the machine body 4, the controller 100 of the work machine 1 according to the present embodiment transmits warning information including a starting approval request of the engine 20 and data of video shot by the photo shooting device 35 to the portable terminal 5 through the communication device 65 without starting the engine 20.

The terminal controller 160 of the portable terminal 5 displays the video shot by the photo shooting device 35 and the starting approval request of the engine 20, acquired through the communication device 66, on the display screen of the touch panel 51. The terminal controller 160 of the portable terminal 5 transmits an approval command to the work machine 1 through the communication device 66 when approval operation to the starting approval request of the engine 20 has been executed to the touch panel 51 by the operator.

The controller 100 of the work machine 1 starts the engine 20 when acquiring the approval command to the starting approval request of the engine 20 from the portable terminal 5 through the communication device 65. This allows the operator to start the engine 20 after viewing the display screen of the touch panel 51 of the portable terminal 5 and confirming that a worker does not exist near the cooling fan 27 and the electrical components. In the following, with reference to FIG. 8 to FIG. 10, description will be made about the contents of control by the terminal controller 160 and the controller 100 when the engine 20 of the work machine 1 is remotely started to execute warm-up operation.

When the starting application 163c is executed, an application execution signal representing that the starting application 163c is being executed and the key ID 163a are transmitted from the portable terminal 5 to the work machine 1. When the starting application 163c is executed, the above-described existence determination processing (see FIG. 4) about the portable terminal 5 is not executed. The engine starting controller 110 executes key authentication processing similar to the step S107 in FIG. 4 when acquiring the application execution signal transmitted from the portable terminal 5. When the key authentication succeeds, the authentication flag is set to the on-state (equivalent to the step S110 in FIG. 4). When the key authentication fails, the authentication flag is set to the off-state (equivalent to the step S113 in FIG. 4). Furthermore, the engine starting controller 110 sets the in-cab flag to the off-state when acquiring the application execution signal transmitted from the portable terminal 5 (equivalent to the step S122 in FIG. 4).

Figure 8:
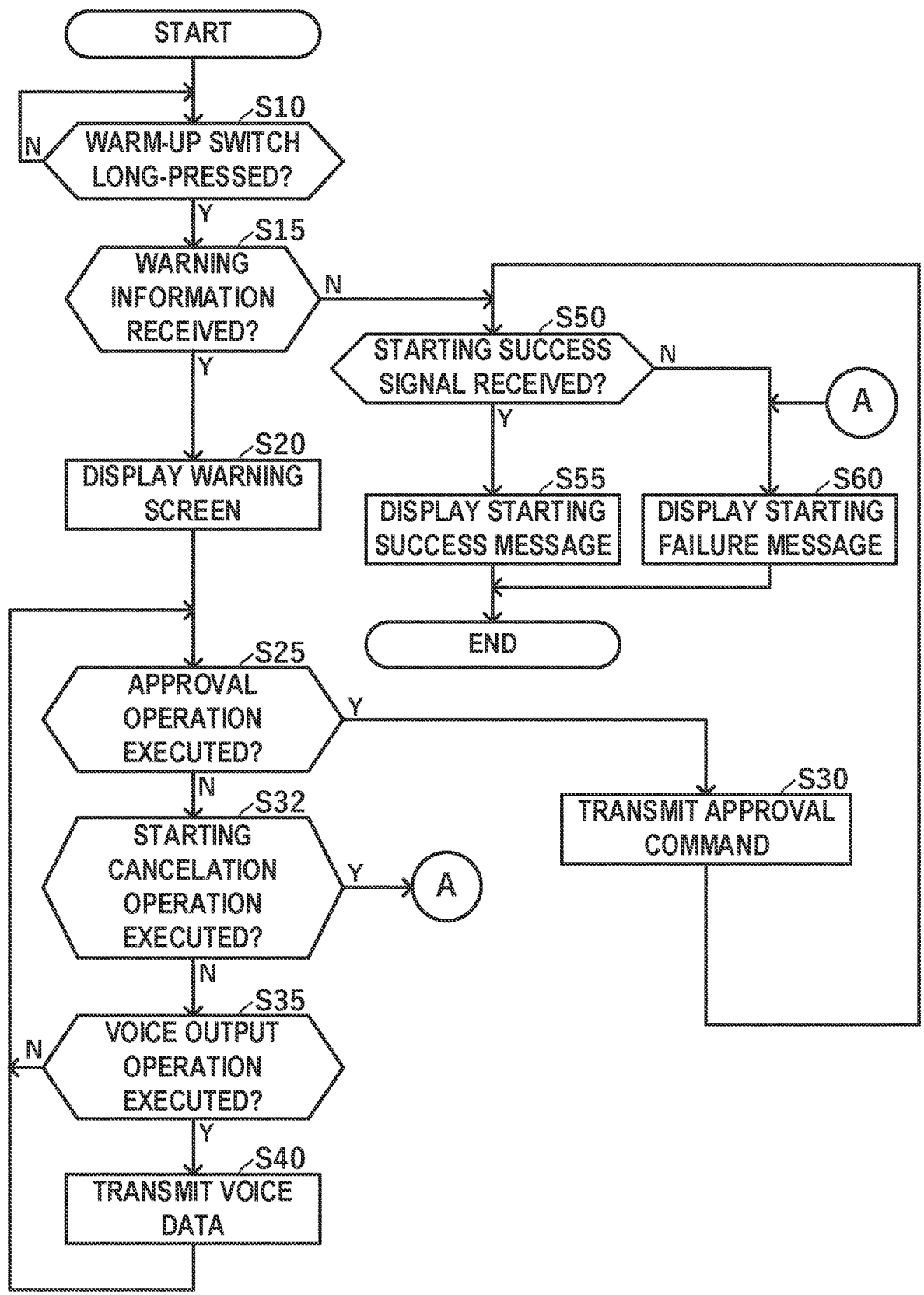
FIG. 8 is a flowchart illustrating the contents of remote starting control executed by a terminal controller.

First, with reference to FIG. 8 and FIG. 9, one example of the contents of remote starting control executed by the terminal controller 160 will be described. FIG. 8 is a flowchart illustrating the contents of the remote starting control executed by the terminal controller 160. The processing illustrated in FIG. 8 is initiated by execution of the starting application 163c and is repeatedly executed at a predetermined control cycle.

As illustrated in FIG. 8, in a step S10, the terminal controller 160 determines whether or not long-press operation of the warm-up switch 51a (see FIG. 1) has been executed. When on-operation of the warm-up switch 51a is executed, the terminal controller 160 measures the time for which the on-operation of the warm-up switch 51a is executed by a timer function. When the on-operation of the warm-up switch 51a is released, the terminal controller 160 executes reset processing of the measured time (hereinafter, referred to as on-operation time ttc) (ttc=0).

In the step S10, when the on-operation time ttc becomes equal to or longer than a threshold ttc0, the terminal controller 160 determines that long-press operation of the warm-up switch 51a has been executed, and proceeds to a step S15. In the step S10, when the on-operation of the warm-up switch 51a is released before the on-operation time ttc reaches the threshold ttc0, the terminal controller 160 determines that long-press operation of the warm-up switch 51a has not been executed, and executes the reset processing of the on-operation time ttc. The processing of the step S10 is repeatedly executed until an affirmative determination is made. The threshold ttc0 is a threshold for determining whether or not long-press operation of the warm-up switch 51a has been executed, and is stored in the non-volatile memory 163 in advance. The threshold ttc0 is longer than the threshold ta0. For example, a value of approximately 3 [sec] is employed.

In the step S15, the terminal controller 160 determines whether or not the warning information has been received. When it is determined that the warning information has been received in the step S15, the processing proceeds to a step S20. When it is determined that the warning information has not been received, the processing proceeds to a step S50.

In the step S50, the terminal controller 160 determines whether the starting success signal has been received or a starting failure signal has been received. When it is determined that the starting success signal has been received in the step S50, the processing proceeds to a step S55. When it is determined that the starting success signal has not been received and the starting failure signal has been received in the step S50, the processing proceeds to a step S60.

In the step S55, the terminal controller 160 causes the display screen of the touch panel 51 to display an image of a message, icon, or the like representing that the starting of the engine 20 has succeeded, and thereafter returns the display screen of the touch panel 51 to the initial screen having the warm-up switch 51a. In the step S60, the terminal controller 160 causes the display screen of the touch panel 51 to display an image of a message, icon, or the like representing that the starting of the engine 20 has failed, and thereafter returns the display screen of the touch panel 51 to the initial screen having the warm-up switch 51a. When the processing of the step S55 or S60 ends, the processing illustrated in the flowchart of FIG. 8 ends.

The terminal controller 160 causes the display screen of the touch panel 51 to display a warning screen in the step S20 and proceeds to a step S25.

Figure 9:
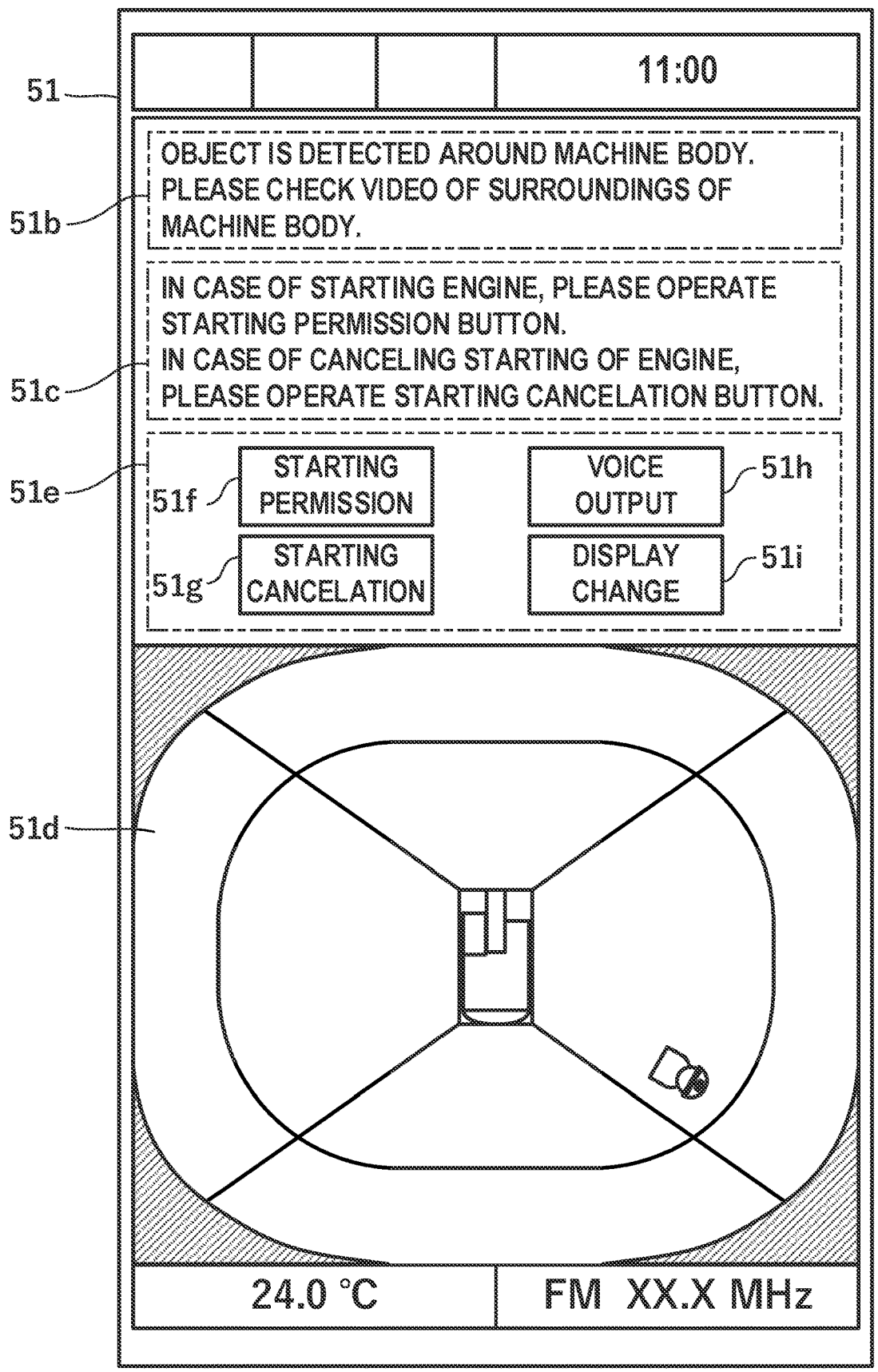
FIG. 9 is a diagram illustrating one example of a warning screen displayed on a touch panel.

FIG. 9 is a diagram illustrating one example of the warning screen displayed on the touch panel 51. The warning screen has a warning message region 51b, an approval request message region 51c, a video display region 51d, and an operation region 51e.

In the warning message region 51b, a message for notifying the operator that an object is detected around the machine body 4 and prompting the operator to check video shot by the cameras 36 to 39 is displayed.

In the approval request message region 51c, a message representing the starting approval request included in the warning information, that is, a message for requesting the operator to approve the starting of the engine 20, is displayed. For example, as illustrated in the diagram, a message indicating that the starting of the engine 20 can be approved by operating a starting permission button 51f is displayed in the approval request message region 51c. Moreover, a message indicating that the starting of the engine 20 can be canceled by operating a starting cancelation button 51g is displayed in the approval request message region 51c. Although not illustrated, a message indicating that voice of the operator can be output by the speaker 79 of the work machine 1 by operating a voice output button 51h may be displayed on the display screen of the touch panel 51.

In the video display region 51d, video shot by the plurality of cameras 36 to 39 is displayed. The video displayed in the video display region 51d is displayed in a display mode selected from a plurality of display modes defined in advance. For example, a first display mode is a display mode in which, as illustrated in the diagram, overhead view video generated from left-side video shot by the left camera 37, right-side video shot by the right camera 38, front-side video shot by the front camera 36, and rear-side video shot by the rear camera 39 is displayed in the whole of the video display region 51d (overhead view display). Furthermore, although not illustrated, a second display mode is a display mode in which the video display region 51d is split into left and tight two regions and the rear-side video is displayed in the left split region and the right-side video is displayed in the right split region (left-right splitting display). Although not illustrated, a third display mode is the following display mode. The video display region 51d is split into upper and lower two regions. Furthermore, the upper split region is split into left and right two regions. The rear-side video is displayed in the lower split region, and the left-side video is displayed in the upper left split region, and the right-side video is displayed in the upper right split region (left-right-rear splitting display).

In the operation region 51e, the starting permission button 51f, the starting cancelation button 51g, the voice output button 51h, and a display change button 51i are displayed. The starting permission button 51f is an operation button for permitting the starting of the engine 20. When touch operation of the starting permission button 51f is executed by the operator, the terminal controller 160 generates the approval command to the starting approval request and transmits the generated approval command to the work machine 1 through the communication device 66.

The starting cancelation button 51g is an operation button for canceling the starting of the engine 20. When touch operation of the starting cancelation button 51g is executed by the operator, the terminal controller 160 generates a cancelation command to cancel the starting of the engine 20 and transmits the generated cancelation command to the work machine 1 through the communication device 66.

The voice output button 51h is an operation button for outputting voice uttered by the operator by the speaker 79 of the work machine 1. When touch operation of the voice output button 51h is executed, the terminal controller 160 executes voice transmission processing. In the voice transmission processing, the terminal controller 160 transmits data of voice collected by the microphone 52 to the work machine 1 through the communication device 66. When touch operation of the voice output button 51h is executed in execution of the voice transmission processing, the terminal controller 160 ends the voice transmission processing.

The display change button 51i is an operation button for switching the display mode of video displayed in the video display region 51d. The terminal controller 160 changes the display mode of video displayed in the video display region 51d every time touch operation of the display change button 51i is executed.

As illustrated in FIG. 8, when the warning screen (see FIG. 9) is displayed on the touch panel 51 in the step S20, the processing proceeds to the step S25. In the step S25, the terminal controller 160 determines whether or not the approval operation to the starting approval request has been executed on the basis of operation to the touch panel 51. In the step S25, when touch operation of the starting permission button 51f has been executed, the terminal controller 160 determines that the approval operation has been executed, and proceeds to a step S30. In the step S25, when touch operation of the starting permission button 51f has not been executed, the terminal controller 160 determines that the approval operation has not been executed, and proceeds to a step S32.

The terminal controller 160 generates the approval command and transmits the generated approval command to the work machine 1 through the communication device 66 in the step S30, and proceeds to the step S50.

In the step S32, the terminal controller 160 determines whether or not starting cancelation operation about the engine 20 has been executed on the basis of operation to the touch panel 51. In the step S32, when touch operation of the starting cancelation button 51g has been executed, the terminal controller 160 determines that the starting cancelation operation about the engine 20 has been executed, and transmits the cancelation command to cancel the starting of the engine 20 to the work machine 1 through the communication device 66. Thereafter, the processing proceeds to the step S60 and the terminal controller 160 causes the display screen of the touch panel 51 to display a message indicating failure in the starting, that is, that the starting has not been executed, as described above, and ends the processing illustrated in the flowchart of FIG. 8. In the step S32, when touch operation of the starting cancelation button 51g has not been executed, the terminal controller 160 determines that the starting cancelation operation about the engine 20 has not been executed, and proceeds to a step S35.

In the step S35, the terminal controller 160 determines whether or not voice output operation has been executed on the basis of operation to the touch panel 51. In the step S35, when touch operation of the voice output button 51h has been executed, the terminal controller 160 determines that the voice output operation has been executed, and proceeds to a step S40. In the step S35, when touch operation of the voice output button 51h has not been executed, the terminal controller 160 determines that the voice output operation has not been executed, and returns to the step S25.

The terminal controller 160 transmits data of voice of the operator collected by the microphone 52 to the work machine 1 through the communication device 66 in the step S40, and returns to the step S25.

Figure 10:
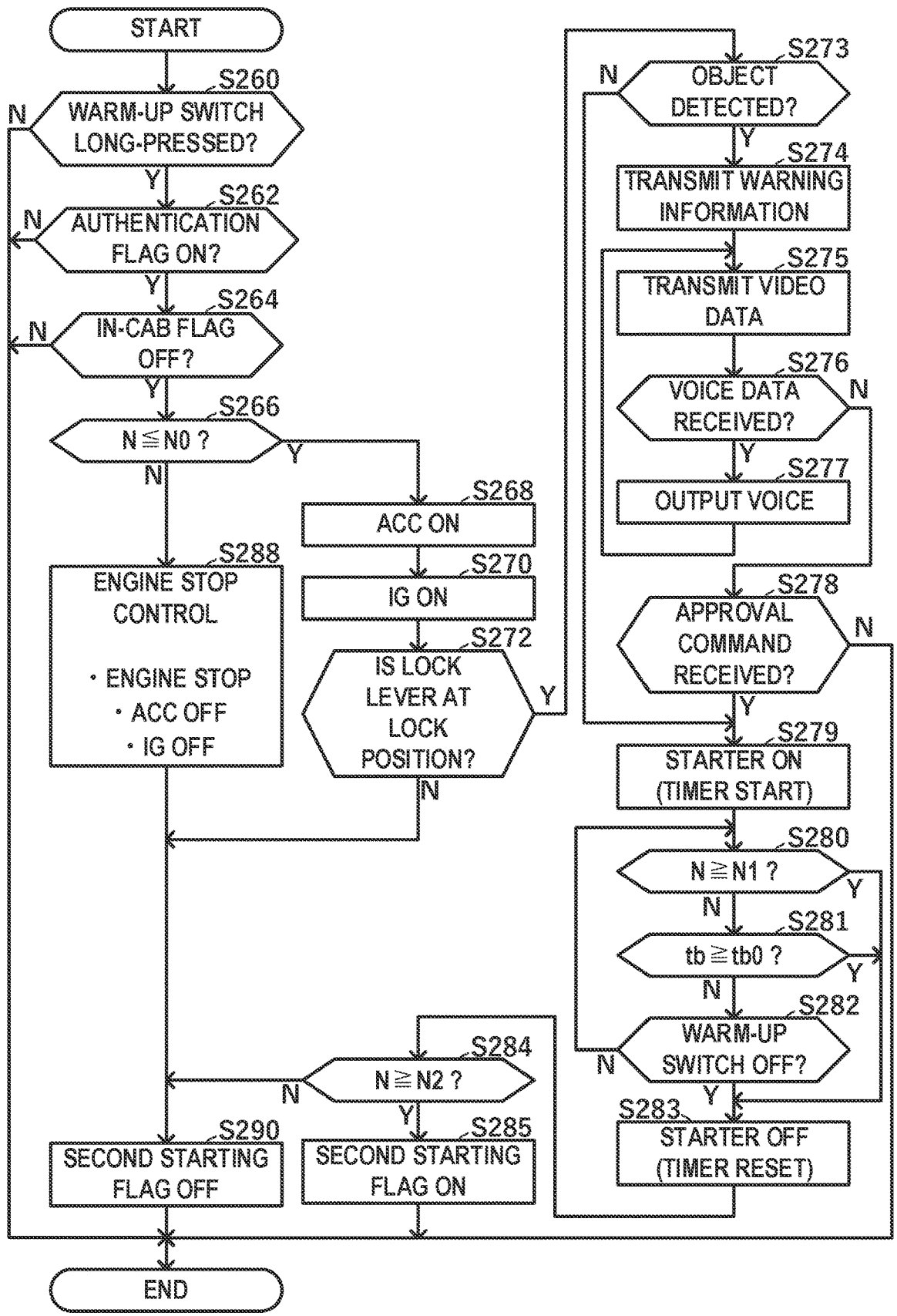
FIG. 10 is a flowchart illustrating the contents of remote starting control of an engine executed by a controller of the work machine.

With reference to FIG. 10, description will be made about remote starting control of the engine 20 based on operation of the warm-up switch 51a, executed by the controller 100 of the work machine 1.

FIG. 10 is a flowchart illustrating the contents of the remote starting control of the engine 20 executed by the controller 100 of the work machine 1. The processing illustrated in FIG. 10 is initiated by acquisition of the application execution signal transmitted from the portable terminal 5 by the controller 100.

Although not illustrated, when on-operation of the warm-up switch 51a is executed, the engine starting controller 110 measures the time for which the on-operation of the warm-up switch 51a is executed by the timer function. When the on-operation of the warm-up switch 51a is released, the engine starting controller 110 executes reset processing of the measured time (hereinafter, referred to as on-operation time tc) (tc=0).

As illustrated in FIG. 10, in a step S260, the engine starting controller 110 determines whether or not long-press operation of the warm-up switch 51a has been executed on the basis of the on-operation time tc of the warm-up switch 51a. In the step S260, when the engine starting command transmitted from the portable terminal 5 is continuously input and the on-operation time tc becomes equal to or longer than a threshold tc0, the engine starting controller 110 determines that long-press operation of the warm-up switch 51a has been executed, and proceeds to a step S262. In the step S260, when the on-operation of the warm-up switch 51a is released before the on-operation time tc reaches the threshold tc0, the engine starting controller 110 determines that long-press operation of the warm-up switch 51a has not been executed, and ends the processing illustrated in the flowchart of FIG. 10. The threshold tc0 is a threshold for determining whether or not long-press operation of the warm-up switch 51a has been executed, and is stored in the non-volatile memory 113 in advance. The threshold tc0 is longer than the threshold ta0. For example, a value of approximately 3 [sec] is employed.

In the step S262, the engine starting controller 110 executes processing similar to the step S162 (see FIG. 7). When it is determined that the authentication flag is set to the on-state in the step S262, the processing proceeds to a step S264. When it is determined that the authentication flag is set to the off-state, the processing illustrated in the flowchart of FIG. 10 ends.

In the step S264, the engine starting controller 110 determines whether or not the in-cab flag is set to the off-state. When it is determined that the in-cab flag is set to the off-state in the step S264, the processing proceeds to a step S266. When it is determined that the in-cab flag is set to the on-state, the processing illustrated in the flowchart of FIG. 10 ends.

In processing of the steps S266 to S290 in FIG. 10, processing of the steps S266, S268, S270, S272, S279, S280, S281, S283, S284, and S288 is similar to the processing of the steps S166, S168, S170, S172, S179, S180, S181, S183, S184, and S188 in FIG. 7 and therefore description thereof is omitted. Description will be made below about processing of the steps S282, S285, and S290 executed instead of the processing of the steps S182, S185, and S190 in FIG. 7 and processing of the steps S273 to S278.

When it is determined that the lock lever device 60 has been operated to the lock position in the step S272, the processing proceeds to the step S273. When it is determined that the lock lever device 60 has not been operated to the lock position, the processing proceeds to the step S290.

In the step S273, the object detection controller 140 determines whether or not an object exists around the machine body 4 on the basis of the detection signal from the object detection device 30. When it is determined that an object exists around the machine body 4 in the step S273, the processing proceeds to the step S274. When it is determined that an object does not exist around the machine body 4, the processing proceeds to the step S279.

The engine starting controller 110 transmits the warning information including the starting approval request of the engine 20 to the portable terminal 5 through the communication device 65 in the step S274, and proceeds to the step S275. The video controller 150 transmits data of video shot by the photo shooting device 35 to the portable terminal 5 through the communication device 65 in the step S275, and proceeds to the step S276.

In the step S276, the machine controller 120 determines whether or not data of voice has been received from the portable terminal 5 through the communication device 65. When it is determined that data of voice has been received in the step S276, the processing proceeds to the step S277. When it is determined that data of voice has not been received, the processing proceeds to the step S278.

In the step S277, the machine controller 120 controls the speaker 79 on the basis of the data of voice to output the voice of the operator from the speaker 79. When the voice output processing (step S277) ends, the processing returns to the step S275.

In the step S278, the engine starting controller 110 determines whether or not the approval command has been received from the portable terminal 5 through the communication device 65. When it is determined that the approval command has been received in the step S278, the processing proceeds to the step S279. When it is determined that the approval command has not been received, the processing illustrated in the flowchart of FIG. 10 ends.

When it is determined that the starter-on time tb is shorter than the threshold tb0 in the step S281, the processing proceeds to the step S282. In the step S282, the engine starting controller 110 determines whether or not the on-operation of the warm-up switch 51a has been released, that is, whether or not off-operation of the warm-up switch 51a has been executed. When it is determined that the on-operation of the warm-up switch 51a has been released in the step S282, the processing proceeds to the step S283. When it is determined that the on-operation of the warm-up switch 51a has not been released, the processing returns to the step S280.

Although illustration is not made in the flowchart, the processing of the step S282 is executed when the negative determination has been made in the processing of the step S273, that is, when an object has not been detected, and is not executed when the affirmative determination has been made in the processing of the step S273. That is, in a case in which an object has been detected, the processing returns to the step S280 when it is determined that the starter-on time tb is shorter than the threshold tb0 in the step S281.

When it is determined that the starting of the engine 20 has succeeded in the step S284, the processing proceeds to the step S285. When it is determined that the starting of the engine 20 has failed, the processing proceeds to the step S290.

The engine starting controller 110 sets a second starting flag representing that the starting of the engine 20 by the on-operation of the warm-up switch 51a has succeeded to the on-state in the step S285, and ends the processing illustrated in the flowchart of FIG. 10. When the second starting flag is set to the on-state, the engine starting controller 110 transmits a starting success signal representing that the starting of the engine 20 has succeeded (warm-up operation has started) to the portable terminal 5 through the communication device 65. Due to this, a message, icon, or the like representing that the starting of the engine 20 has succeeded is displayed on the touch panel 51 of the portable terminal 5. As a result, the operator can come to know that warm-up operation has been started.

The engine starting controller 110 sets the second starting flag to the off-state in the step S290 and ends the processing illustrated in the flowchart of FIG. 10. When the second starting flag is set to the off-state, the engine starting controller 110 transmits a starting failure signal representing that the starting of the engine 20 has failed to the portable terminal 5 through the communication device 65. Due to this, a message, icon, or the like representing that the starting of the engine 20 has failed is displayed on the touch panel 51 of the portable terminal 5. As a result, the operator can come to know that the starting of the engine 20 has failed.

Although not illustrated, when the second starting flag is set to the off-state, the engine starting controller 110 generates a command for turning off the ACC relay 142 and the IG relay 143 and outputs the command to the ACC relay 142 and the IG relay 143 to turn off the ACC relay 142 and the IG relay 143.

Furthermore, although not illustrated, when it is determined that the approval command has not been received in the step S278, the engine starting controller 110 executes also determination of whether or not the cancelation command for canceling the starting of the engine 20 has been received. When determining that the cancelation command has been received, the engine starting controller 110 proceeds to the step S290 to turn off the respective relays 142 and 143 and transmit the starting failure signal to the portable terminal 5.

As above, in the present embodiment, when the portable terminal 5 exists outside the cab 7, the engine starting controller 110 starts the engine 20 on condition that the key authentication of the portable terminal 5 has succeeded, that the engine 20 is stopped, that the lock lever device 60 has been operated to the lock position, that long-press operation of the warm-up switch 51a of the portable terminal 5 is executed (that is, the engine starting command transmitted from the portable terminal 5 has been continuously acquired for a predetermined time or longer), and that an object does not exist around the machine body 4 of the work machine 1.

In this manner, in the present embodiment, the controller 100 starts the engine 20 in a case in which the engine starting command has been acquired from the portable terminal 5 through the communication device 65 and when it is determined that an object does not exist around the machine body 4. Moreover, when it is determined that an object exists around the machine body 4, the controller 100 transmits data of video shot by the photo shooting device 35 and the starting approval request of the engine 20 to the portable terminal 5 through the communication device 65. The controller 100 starts the engine 20 when acquiring the approval command to the starting approval request of the engine 20 from the portable terminal 5 through the communication device 65. Therefore, the engine 20 can be started and warm-up operation can be executed even when an object exists around the machine body 4. Thus, the start clock time of work can be made earlier and the work efficiency can be improved.

Figure 11:
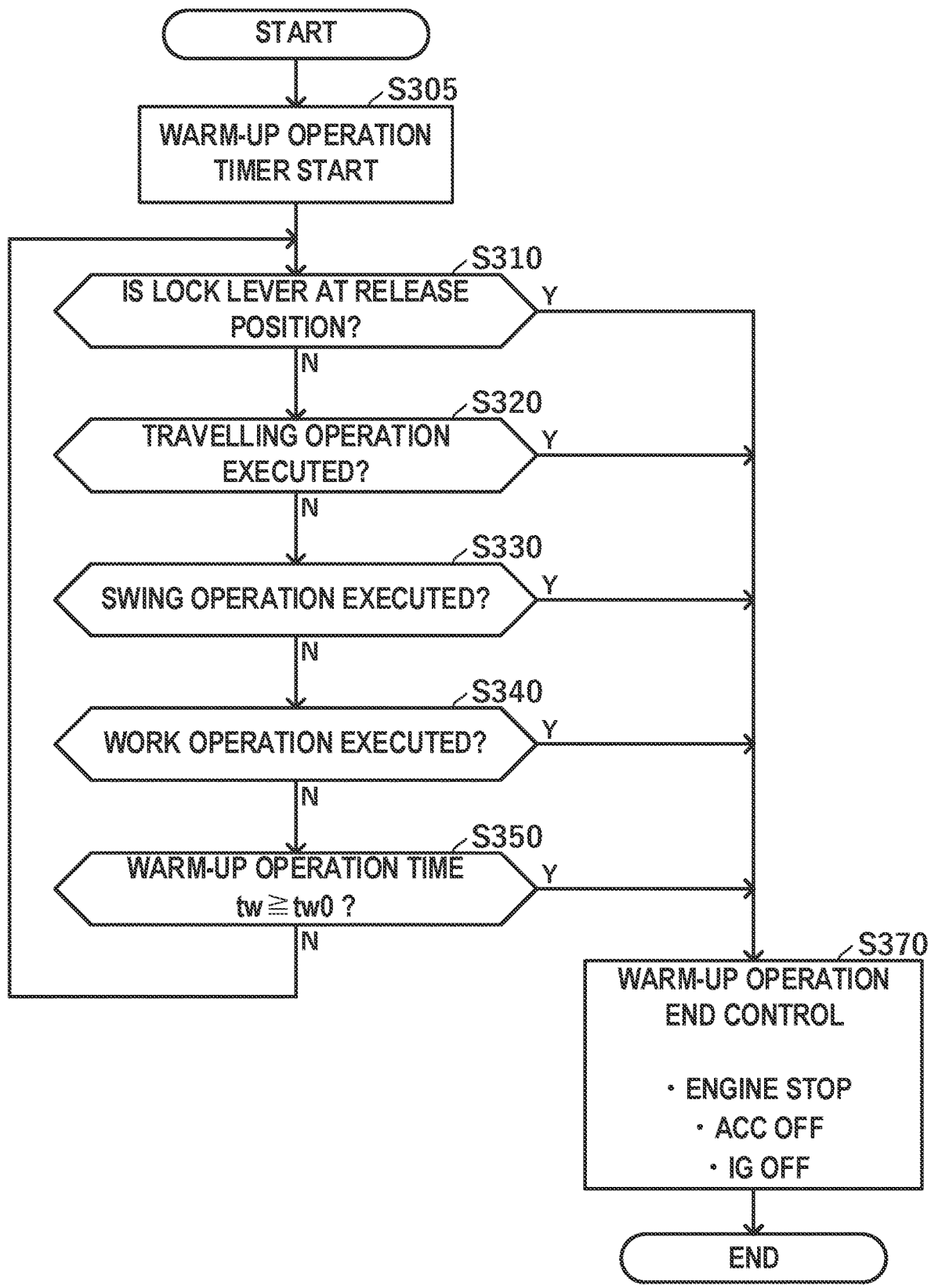
FIG. 11 is a flowchart illustrating the contents of warm-up operation control executed by the engine starting controller of the work machine.

When the starting of the engine 20 succeeds by the operation of the warm-up switch 51a of the portable terminal 5, the engine starting controller 110 executes warm-up operation to operate the engine 20 until a predetermined time elapses. With reference to FIG. 11, warm-up operation control executed by the engine starting controller 110 of the work machine 1 will be described.

FIG. 11 is a flowchart illustrating the contents of the warm-up operation control executed by the engine starting controller 110 of the work machine 1. Processing illustrated in FIG. 11 is initiated by setting of the second starting flag to the on-state in the step S285 in FIG. 10.

As illustrated in FIG. 11, in a step S305, the engine starting controller 110 starts measurement of the time after the second starting flag is set to the on-state (hereinafter, referred to as warm-up operation time tw) by the timer function, and proceeds to a step S310.

In the step S310, the engine starting controller 110 determines whether or not the lock lever device 60 has been operated to the lock release position on the basis of a signal representing the sensing result from the lock lever operation sensor 60a. When it is determined that the lock lever device 60 has been operated to the lock release position in the step S310, the processing proceeds to a step S370. When it is determined that the lock lever device 60 has not been operated to the lock release position (that is, the lock lever device 60 is kept at the lock position), the processing proceeds to a step S320.

In the step S320, the engine starting controller 110 determines whether or not operation for causing the travelling hydraulic motors 2a to act (that is, travelling operation for causing the track structure 2 to travel) has been executed by the operation device 183 on the basis of signals representing the sensing result from the operation sensors 188a and 188b. When an operation pressure Pa sensed by the operation sensors 188a and 188b is equal to or higher than a threshold PaO, the engine starting controller 110 determines that operation for causing the travelling hydraulic motors 2a to act has been executed by the operation device 183, and proceeds to the step 370. When the operation pressure Pa sensed by the operation sensors 188a and 188b is lower than the threshold PaO, the engine starting controller 110 determines that operation for causing the travelling hydraulic motors 2a to act has not been executed by the operation device 183, and proceeds to a step 330. The threshold PaO is a threshold for determining whether or not operation for causing the travelling hydraulic motors 2a to act has been executed, and is stored in the non-volatile memory 113 in advance.

In the step S330, the engine starting controller 110 determines whether or not operation for causing the swing hydraulic motor 3a to act (that is, swing operation for causing the swing structure 3 to swing) has been executed by the operation device 182 on the basis of signals representing the sensing result from the operation sensors 187a and 187b. When an operation pressure Pb sensed by the operation sensors 187a and 187b is equal to or higher than a threshold Pb0, the engine starting controller 110 determines that operation for causing the swing hydraulic motor 3a to act has been executed by the operation device 182, and proceeds to the step 370. When the operation pressure Pb sensed by the operation sensors 187a and 187b is lower than the threshold Pb0, the engine starting controller 110 determines that operation for causing the swing hydraulic motor 3a to act has not been executed by the operation device 182, and proceeds to a step 340. The threshold Pb0 is a threshold for determining whether or not operation for causing the swing hydraulic motor 3a to act has been executed, and is stored in the non-volatile memory 113 in advance.

In the step S340, the engine starting controller 110 determines whether or not operation for causing the hydraulic cylinder 10a to act (that is, work operation for causing the work device 10 to act) has been executed by the operation device 181 on the basis of signals representing the sensing result from the operation sensors 186a and 186b. When an operation pressure Pc sensed by the operation sensors 186a and 186b is equal to or higher than a threshold Pc0, the engine starting controller 110 determines that operation for causing the hydraulic cylinder 10a to act has been executed by the operation device 181, and proceeds to the step 370. When the operation pressure Pc sensed by the operation sensors 186a and 186b is lower than the threshold Pc0, the engine starting controller 110 determines that operation for causing the hydraulic cylinder 10a to act has not been executed by the operation device 181, and proceeds to a step 350. The threshold Pc0 is a threshold for determining whether or not operation for causing the hydraulic cylinder 10a to act has been executed, and is stored in the non-volatile memory 113 in advance.

In the step S350, the engine starting controller 110 determines whether or not the warm-up operation time tw is equal to or longer than a threshold tw0. When it is determined that the warm-up operation time tw is equal to or longer than the threshold tw0 in the step S350, the processing proceeds to the step S370. When it is determined that the warm-up operation time tw is shorter than the threshold tw0, the processing returns to the step S310. The threshold tw0 is a threshold set for automatically stopping the engine 20 in a case in which stop operation of the engine 20 by the operator is forgotten after the warm-up operation of the engine 20 is executed, and is stored in the non-volatile memory 113 in advance. As the threshold tw0, for example, a value of approximately 10 [min] is employed.

In the step S370, the engine starting controller 110 executes warm-up operation end control. In the warm-up operation end control, the engine starting controller 110 generates a stop command and outputs it to the engine controller 130 to end the control of the fuel injection device 22 by the engine controller 130 and stop the engine 20. In the warm-up operation end control, the engine starting controller 110 generates a command for turning off the ACC relay 142 and outputs the command to the ACC relay 142 to turn off the ACC relay 142. In the warm-up operation end control, the engine starting controller 110 generates a command for turning off the IG relay 143 and outputs the command to the IG relay 143 to turn off the IG relay 143. This stops the engine 20, the machine controller 120, the engine controller 130, the object detection controller 140, and the video controller 150. In the warm-up operation end control, the engine starting controller 110 executes also reset processing of the warm-up operation time tw (tw=0).

As above, in the present embodiment, the engine starting controller 110 stops the engine 20 in a case in which the engine 20 has been started due to satisfaction of the second starting condition and when operation of the lock lever device 60 from the lock position to the lock release position is sensed by the lock lever operation sensor 60a as the operation sensor. Due to this, the engine 20 automatically stops when, in warm-up operation, a third party rides in the cab 7 and operates the lock lever device 60 from the lock position to the lock release position for operating the work machine 1. Therefore, theft of the work machine 1 by a third party in warm-up operation can be prevented.

According to the above-described embodiment, the following operation and effects are provided.

(1) The remote operation system 90 of the work machine includes the controller 100 that controls the work machine 1 and the portable terminal (external information terminal) 5 that executes communication with the controller 100. The work machine 1 includes the machine body 4, the work device 10 attached to the machine body 4, the plurality of hydraulic actuators (boom cylinder 11a, arm cylinder 12a, and bucket cylinder 13a) that drive the work device 10, the engine (prime mover) 20, and the hydraulic pump 25 that is driven by the engine 20 and supplies the hydraulic operating fluid to the hydraulic actuators. The work machine 1 includes also the object detection device 30 that is attached to the machine body 4 and detects an object existing around the machine body 4, the photo shooting device 35 that is attached to the machine body 4 and shoots the surroundings of the machine body 4, and the communication device 65 that executes communication with the portable terminal (external information terminal) 5.

The portable terminal 5 transmits the engine starting command (prime mover starting command) to start the engine 20 to the work machine 1 through operation by an operator. The controller 100 of the work machine 1 controls starting of the engine 20 on the basis of the engine starting command acquired from the portable terminal 5 through the communication device 65. Specifically, the controller 100 of the work machine 1 determines whether or not an object exists around the machine body 4 on the basis of the detection signal arising from detection by the object detection device 30. The controller 100 starts the engine 20 in a case in which the engine starting command has been acquired from the portable terminal 5 through the communication device 65 and when it is determined that an object does not exist around the machine body 4. On the other hand, the controller 100 transmits data of video shot by the photo shooting device 35 and the starting approval request of the engine 20 to the portable terminal 5 through the communication device 65 without starting the engine 20 in a case in which the engine starting command has been acquired from the portable terminal 5 through the communication device 65 and when it is determined that an object exists around the machine body 4.

The portable terminal 5 displays the video shot by the photo shooting device 35 and the starting approval request of the engine 20 on the display screen of the touch panel 51. For example, the portable terminal 5 displays, on the display screen, a message that explains operation in the case of approving starting of the engine 20 as the starting approval request (see FIG. 9). The portable terminal 5 transmits the approval command to the work machine 1 when approval operation to the starting approval request of the engine 20, that is, touch operation to the starting permission button 51*f*, is executed by the operator. The controller 100 starts the engine 20 when acquiring the approval command to the starting approval request of the engine 20 from the portable terminal 5 through the communication device 65.

According to this configuration, even in a case in which the engine starting command is transmitted from the portable terminal 5, the engine 20 is not immediately started when a worker or the like is detected around the machine body 4 of the work machine 1. Thus, it is possible to prevent the worker from getting contact with the movable part such as the cooling fan 27 or the energized electrical component.

Furthermore, when the controller 100 of the work machine 1 acquires the engine starting command in a case in which a worker or the like is detected, video shot by the photo shooting device 35 is displayed on the display screen of the portable terminal 5. This allows the operator to confirm that a worker is not located near the movable parts such as the cooling fan 27 and the electrical components from the video of the surroundings of the machine body 4 of the work machine 1, displayed on the display screen of the portable terminal 5. The operator can start the engine 20 by executing the approval operation after confirming that a worker does not exist near the movable parts and the electrical components of the work machine 1. This can start the engine 20 even when an object is detected around the machine body 4 of the work machine 1. Therefore, according to the present embodiment, it is possible to provide the work machine 1 and the remote operation system 90 that can remotely start the engine 20 properly according to the situation of the surroundings of the machine body 4. As a result, according to the present embodiment, the start timing of work by the work machine 1 can be made earlier and the work efficiency can be improved compared with the technique in which starting of the engine 20 is always prohibited when an object is detected around the machine body 4 of the work machine 1.

(2) The work machine 1 includes the speaker (sound output device) 79. The controller 100 of the work machine 1 causes voice of the operator acquired from the portable terminal 5 through the communication device 65 to be output by the speaker 79.

According to this configuration, for example, the operator can prompt a worker who exists around the machine body 4 of the work machine 1 to separate from the machine body 4 by outputting voice from the speaker 79 of the work machine 1 by using the portable terminal 5. This can make the start timing of starting of the engine 20 earlier and improve the work efficiency.

The following modification examples are also within the scope of the present invention, and it is also possible to combine a configuration illustrated in the modification example and a configuration explained in the above-described embodiment and combine configurations to be described in the following different modification examples with each other.

Modification Example 1

Figure 12:
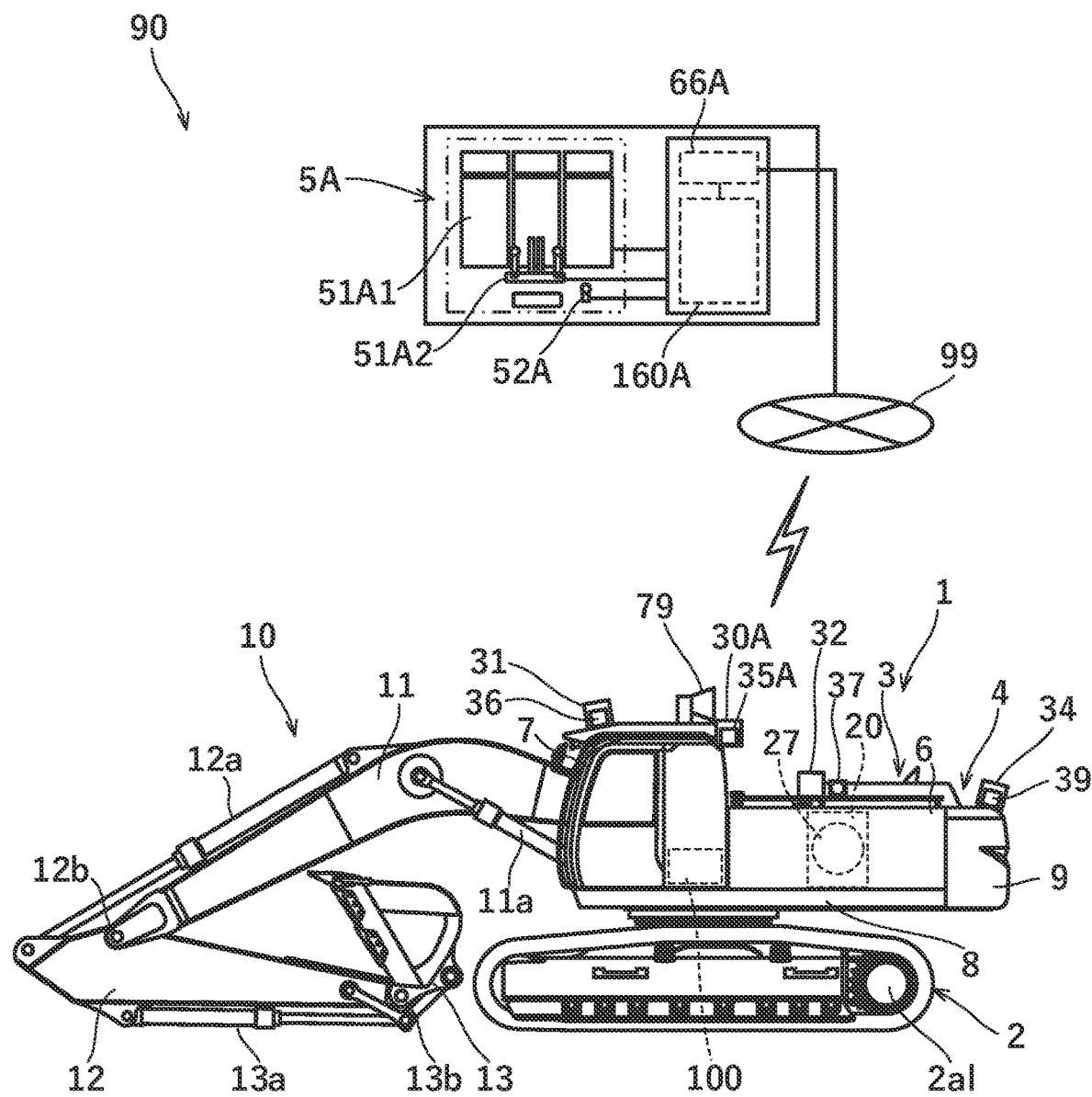
FIG. 12 is a side view of the work machine according to a modification example of the present embodiment.

As illustrated in FIG. 12, the work machine 1 may include an upper-side detection device 30A that is attached to the machine body 4 and detects an object existing on the upper side of the machine body 4 and an upper-side photo shooting device 35A that is attached to the machine body 4 and shoots the upper side of the machine body 4 in addition to the configuration of the above-described embodiment. The upper-side detection device 30A and the upper-side photo shooting device 35A are attached to the upper surface or the back surface of the outer shell of the cab 7 for example.

The upper-side detection device 30A includes a detection sensor that can measure the distance to an object by using ultrasonic waves or infrared rays similarly to the object detection device 30 of the above-described embodiment. The upper-side detection device 30A may include a detection sensor of a millimeter wave radar, 3D-Lidar, or the like. The upper-side photo shooting device 35A includes a camera including an imaging element of a CCD, CMOS, or the like and a wide-angle lens similarly to the photo shooting device 35 of the above-described embodiment.

The controller 100 determines whether or not an object exists on the upper side of the machine body 4 on the basis of a detection signal arising from detection by the upper-side detection device 30A. The controller 100 starts the engine 20 in a case in which the engine starting command has been acquired from the portable terminal 5 through the communication device 65 and when it is determined that an object exists neither around the machine body 4 nor on the upper side of the machine body 4.

The controller 100 transmits data of video shot by the photo shooting device 35 and the starting approval request of the engine 20 to the portable terminal 5 through the communication device 65 without starting the engine 20 in a case in which the engine starting command has been acquired from the portable terminal 5 through the communication device 65 and when it is determined that an object exists around the machine body 4. The portable terminal 5 displays the video shot by the photo shooting device 35 and the starting approval request of the engine 20 on the display screen.

The controller 100 transmits data of video shot by the upper-side photo shooting device 35A and the starting approval request of the engine 20 to the portable terminal 5 through the communication device 65 without starting the engine 20 in a case in which the engine starting command has been acquired from the portable terminal 5 through the communication device 65 and when it is determined that an object exists on the upper side of the machine body 4. The portable terminal 5 displays the video shot by the upper-side photo shooting device 35A and the starting approval request of the engine 20 on the display screen.

According to this configuration, even in a case in which the engine starting command is transmitted from the portable terminal 5, the engine 20 is not immediately started when a worker exists on the upper side of the machine body 4 of the work machine 1. Thus, for example, it is possible to prevent a worker who is executing maintenance work on the machine body 4 from getting contact with the movable part such as the cooling fan 27 or the energized electrical component.

Furthermore, the controller 100 of the work machine 1 transmits data of video shot by the upper-side photo shooting device 35A to the portable terminal 5 when acquiring the engine starting command in a case in which a worker or the like is detected. This allows the operator to confirm that a worker is not located near the movable parts such as the cooling fan 27 and the electrical components from the video of the upper side of the machine body 4 of the work machine 1, displayed on the display screen of the portable terminal 5. The operator can start the engine 20 by executing approval operation after confirming that a worker does not exist near the movable parts and the electrical components of the work machine 1. This can start the engine 20 even when an object is detected around the machine body 4 of the work machine 1.

Therefore, according to the present second embodiment, it is possible to provide the work machine 1 and the remote operation system 90 that can remotely start the engine 20 properly according to the situation of not only the surroundings of the machine body 4 but also the upper side of the machine body 4.

Modification Example 2

In the above-described embodiment, description has been made about the example in which the external information terminal that transmits the starting command of the engine 20 of the work machine 1 is the portable terminal 5 such as a smartphone. However, the present invention is not limited thereto. As illustrated in FIG. 12, the external information terminal may be a remote operation device 5A that can remotely operate the hydraulic actuators of the work machine 1.

The remote operation device 5A gives and receives information to and from the controller 100 of the work machine 1 through the communication line 99. The remote operation device 5A includes a communication device 66A for executing communication with the work machine 1, a display device 51A1 that displays machine body data (including image data) transmitted from the work machine 1 on a display screen, and an operation device 51A2 that outputs an operation command of the hydraulic actuators of the work device 10, the track structure 2, and the swing structure 3. The remote operation device 5A includes also a terminal controller 160A that executes control to display an image on the display device 51A1 on the basis of information acquired through the communication device 66A and control to transmit the operation command of the operation device 51A2 to the work machine 1 through the communication device 66A and a microphone 52A as a sound collecting device that collects voice of the operator.

In a case in which the operator has no intention to swing the swing structure 3 immediately after starting of the engine 20, a worker does not get contact with the swing structure 3 even when the engine 20 is started. This allows the operator to start the engine 20 by executing approval operation after confirming that a worker does not exits near the movable parts and the electrical components of the work machine 1.

Modification Example 3

In the above-described embodiment, description has been made about the example in which the object detection device 30 includes the four detection sensors 31 to 34 and the photo shooting device 35 includes the four cameras 36 to 39. However, the present invention is not limited thereto. It suffices for the object detection device 30 to include at least one or more detection sensors that detect an object existing around the machine body 4. Furthermore, it suffices for the photo shooting device 35 to include at least one or more cameras that shoot the surroundings of the machine body 4.

Modification Example 4

The example in which the key authentication processing is executed as personal authentication processing of the operator has been described. However, the present invention is not limited thereto. For example, personal authentication processing by a personal identification number may be executed or personal authentication processing by face authentication, fingerprint authentication, or the like may be executed.

Modification Example 5

In the above-described embodiment, description has been made about the example in which whether or not the portable terminal 5 exists in the cab 7 is determined on the basis of the intensity of radio waves directly transmitted from the portable terminal 5 to the work machine 1. However, the present invention is not limited thereto.

For example, a connection terminal that can connect to the portable terminal 5 is disposed in the cab 7, and a configuration in which the key ID 163a is output to the engine starting controller 110 by wire when the portable terminal 5 is connected to the connection terminal is made. In this case, the engine starting controller 110 determines that the portable terminal 5 exists in the cab 7 when the portable terminal 5 is connected to the connection terminal, and determines that the portable terminal 5 does not exist in the cab 7 when the portable terminal 5 is not connected to the connection terminal.

Modification Example 6

In the above-described embodiment, the example in which the actuator operation sensors 186a, 186b, 187a, 187b, 188a, and 188b are pressure sensors that sense the operation pressure has been described. However, the present invention is not limited thereto. It suffices that the actuator operation sensors are what can sense operation for causing the actuator of the work machine 1 to act. For example, the actuator operation sensors may be potentiometers that can sense the operation angle (operation amount) of the actuator operation devices 181, 182, and 183. Moreover, sensors that can sense actual action of the actuator of the work machine 1 may be employed as the actuator operation sensors. For example, a posture sensor (angle sensor) that senses the posture (angle) of the work device 10 may be employed instead of the actuator operation sensors 186a and 186b. Furthermore, a revolution speed sensor that senses the revolution speed of the swing hydraulic motor 3a may be employed instead of the actuator operation sensors 187a and 187b. Moreover, a revolution speed sensor that senses the revolution speed of the travelling hydraulic motors 2a may be employed instead of the actuator operation sensors 188a and 188b.

Modification Example 7

In the above-described embodiment, description has been made by taking as an example the case in which the work machine 1 is a hydraulic excavator of a crawler type. However, the present invention is not limited thereto. The present invention can be applied to various work machines including a work device that operates by a hydraulic actuator, such as wheel type hydraulic excavator, wheel loader, forklift, crawler crane, and dump truck.

Modification Example 8

In the above-described embodiment, the example in which the processing devices of the respective controllers 110, 120, 130, 140, 150, and 160 are CPUs has been described. However, the present invention is not limited thereto. The processing device may be a MPU (Micro Processing Unit), DSP (Digital Signal Processor), ASIC (application specific integrated circuit), FPGA (Field Programmable Gate Array), or the like.

Modification Example 9

Furthermore, although description has been made by taking as an example the engine as the prime mover, the present invention is not limited thereto. An electric motor, a fuel cell, or the like may be employed as the prime mover or what is obtained by combining them may be employed as the prime mover.

Although the embodiment of the present invention has been described above, the above-described embodiment has merely illustrated part of application examples of the present invention and does not intend to limit the technical scope of the present invention to the specific configurations of the above-described embodiment.

DESCRIPTION OF REFERENCE CHARACTERS

1: Work machine
2: Track structure
2a: Travelling hydraulic motor (hydraulic actuator)
3: Swing structure
3a: Swing hydraulic motor (hydraulic actuator)
4: Machine body
5: Portable terminal (external information terminal)
5A: Remote operation device (external information terminal)
6: Engine chamber
7: Cab
8: Swing frame
9: Counterweight
10: Work device
10a: Hydraulic cylinder (hydraulic actuator)
11: Boom
11a: Boom cylinder (hydraulic actuator)
12: Arm
12a: Arm cylinder (hydraulic actuator)
13: Bucket
13a: Bucket cylinder (hydraulic actuator)
20: Engine (prime mover)
25: Main pump (hydraulic pump)
27: Cooling fan
28: Battery
30: Object detection device
30A: Upper-side detection device
31 to 34: Detection sensor
35: Photo shooting device
35A: Upper-side photo shooting device
36 to 39: Camera
51: Touch panel
51a: Warm-up switch
51b: Warning message region
51c: Approval request message region
51d: Video display region
51e: Operation region
51f: Starting permission button
51g: Starting cancelation button
51h: Voice output button
51i: Display change button
51A1: Display device
51A2: Operation device
52, 52A: Microphone (sound collecting device)
60: lock Lever device (operation device)
60a: Lock lever operation sensor
61: IG switch
65: Communication device
66, 66A: Communication device
70: Shut-off valve
79: Speaker (sound output device)
80: Hydraulic drive system
81 to 83: Control valve
90: Remote operation system
99: Communication line
100: Controller
110: Engine starting controller
113: Non-volatile memory (storage device)
120: Machine controller
130: Engine controller
140: Object detection controller
141: Starter relay
142: ACC relay
143: IG relay
144: Starter motor
150: Video controller
160, 160A: Terminal controller
163: Non-volatile memory (storage device)
181 to 183: Operation device
186a, 186b, 187a, 187b, 188a, 188b: Operation sensor

The invention claimed is:

1. A work machine including a machine body, a work device attached to the machine body, a plurality of hydraulic actuators that drive the work device, a prime mover, a hydraulic pump that is driven by the prime mover and supplies a hydraulic operating fluid to the hydraulic actuators, an object detection device that is attached to the machine body and detects an object existing around the machine body, a photo shooting device that is attached to the machine body and shoots surroundings of the machine body, a communication device that executes communication with an external information terminal, and a controller that controls starting of the prime mover on a basis of a prime mover starting command acquired from the external information terminal through the communication device, wherein the controller is configured to
- determine whether or not an object exists around the machine body on a basis of a detection signal arising from detection by the object detection device,
- start the prime mover in a case in which the prime mover starting command has been acquired from the external information terminal through the communication device and in a case it is determined that an object does not exist around the machine body,
- transmit data of video shot by the photo shooting device and a starting approval request of the prime mover to the external information terminal through the communication device without starting the prime mover in the case in which the prime mover starting command has been acquired from the external information terminal through the communication device and in a case it is determined that an object exists around the machine body, and
- start the prime mover in a case acquiring an approval command to the starting approval request of the prime mover from the external information terminal through the communication device.

2. The work machine according to claim 1, wherein the work machine includes a sound output device, and the controller is configured to cause voice of an operator acquired from the external information terminal through the communication device to be output by the sound output device.

3. The work machine according to claim 1, wherein the work machine includes
an upper-side detection device that is attached to the machine body and detects an object existing on an upper side of the machine body, and
an upper-side photo shooting device that is attached to the machine body and shoots the upper side of the machine body, and
the controller is configured to
- determine whether or not an object exists on the upper side of the machine body on a basis of a detection signal arising from detection by the upper-side detection device,
- start the prime mover in the case in which the prime mover starting command has been acquired from the external information terminal through the communication device and in a case it is determined that an object exists neither around the machine body nor on the upper side of the machine body,
- transmit the data of the video shot by the photo shooting device and the starting approval request of the prime mover to the external information terminal through the communication device without starting the prime mover in the case in which the prime mover starting command has been acquired from the external information terminal through the communication device and in a case it is determined that an object exists around the machine body, and
- transmit data of video shot by the upper-side photo shooting device and the starting approval request of the prime mover to the external information terminal through the communication device without starting the prime mover in the case in which the prime mover starting command has been acquired from the external information terminal through the communication device and in a case it is determined that an object exists on the upper side of the machine body.

4. A remote operation system remotely operating a prime mover of a work machine by an external information terminal, the remote operation system including a controller that controls the work machine and including the external information terminal, the work machine including a machine body, a work device attached to the machine body, a plurality of hydraulic actuators that drive the work device, the prime mover, a hydraulic pump that is driven by the prime mover and supplies a hydraulic operating fluid to the hydraulic actuators, an object detection device that is attached to the machine body and detects an object existing around the machine body, a photo shooting device that is attached to the machine body and shoots surroundings of the machine body, and a communication device that executes communication with the external information terminal, wherein the external information terminal transmits a prime mover starting command to start the prime mover to the work machine through operation by an operator,
the controller is configured to
- determine whether or not an object exists around the machine body on a basis of a detection signal arising from detection by the object detection device,
- start the prime mover in a case in which the prime mover starting command has been acquired from the external information terminal through the communication device and in a case it is determined that an object does not exist around the machine body, and
- transmit data of video shot by the photo shooting device and a starting approval request of the prime mover to the external information terminal through the communication device without starting the prime mover in the case in which the prime mover starting command has been acquired from the external information terminal through the communication device and in a case it is determined that an object exists around the machine body,
the external information terminal
- displays the video shot by the photo shooting device and the starting approval request of the prime mover on a display screen, and
- transmits an approval command to the work machine in a case approval operation to the starting approval request of the prime mover is executed by the operator, and
the controller is configured to start the prime mover in a case acquiring the approval command to the starting approval request of the prime mover from the external information terminal through the communication device.

* * * * *